US009938406B2

(12) United States Patent
Hashimoto et al.

(10) Patent No.: US 9,938,406 B2
(45) Date of Patent: Apr. 10, 2018

(54) POLYLACTIC ACID RESIN SHEET FOR THERMAL MOLDING USE

(71) Applicant: KAO CORPORATION, Tokyo (JP)

(72) Inventors: Ryoichi Hashimoto, Iwade (JP); Munehisa Okutsu, Takaishi (JP); Hirofumi Nakanishi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 70 days.

(21) Appl. No.: 14/398,846

(22) PCT Filed: May 14, 2013

(86) PCT No.: PCT/JP2013/063443
§ 371 (c)(1),
(2) Date: Nov. 4, 2014

(87) PCT Pub. No.: WO2013/172351
PCT Pub. Date: Nov. 21, 2013

(65) Prior Publication Data
US 2015/0086768 A1 Mar. 26, 2015

(30) Foreign Application Priority Data

May 18, 2012 (JP) .................. 2012-114064
Aug. 8, 2012 (JP) .................. 2012-176192

(51) Int. Cl.
*B29C 47/88* (2006.01)
*C08L 67/04* (2006.01)
*C08K 5/06* (2006.01)
*B29C 51/00* (2006.01)
*B29C 51/10* (2006.01)
*C08J 5/18* (2006.01)
*C08K 5/11* (2006.01)
*C08K 5/20* (2006.01)
*C08K 5/521* (2006.01)
*C08K 5/00* (2006.01)
*B29B 11/10* (2006.01)
*B29C 47/00* (2006.01)
*B29K 67/00* (2006.01)
*B29K 105/00* (2006.01)

(52) U.S. Cl.
CPC .............. *C08L 67/04* (2013.01); *B29B 11/10* (2013.01); *B29C 47/0021* (2013.01); *B29C 51/002* (2013.01); *B29C 51/10* (2013.01); *C08J 5/18* (2013.01); *C08K 5/0016* (2013.01); *C08K 5/0083* (2013.01); *C08K 5/06* (2013.01); *C08K 5/11* (2013.01); *C08K 5/20* (2013.01); *C08K 5/521* (2013.01); *B29C 47/8845* (2013.01); *B29K 2067/046* (2013.01); *B29K 2105/0005* (2013.01); *B29K 2105/0038* (2013.01); *C08J 2367/04* (2013.01)

(58) Field of Classification Search
CPC . C08L 67/04; B29C 47/8845; B29C 47/0021; B29C 51/10; B29C 51/002; B29B 11/10; C08K 5/0083; C08K 5/0016; C08K 5/11; C08K 5/20; C08K 5/521; C08K 5/06; B29K 2105/0038; B29K 2105/0005; B29K 2067/046; C08J 2367/04; C08J 5/18
See application file for complete search history.

(56) References Cited

U.S. PATENT DOCUMENTS

| | | | | |
|---|---|---|---|---|
| 4,725,483 A | * | 2/1988 | Ishii | .................... B29C 47/8845 428/220 |
| 8,722,813 B2 | * | 5/2014 | Sawada | ................... C08L 67/04 524/132 |
| 8,785,520 B2 | | 7/2014 | Tsuboi et al. | |
| 2003/0038405 A1 | * | 2/2003 | Bopp | .................... B29C 51/002 264/319 |
| 2005/0001349 A1 | * | 1/2005 | Yosimura | ................. C08K 5/20 264/211 |

(Continued)

FOREIGN PATENT DOCUMENTS

DE 198 29 991 A1 1/2000
JP 2011-241347 A 12/2001
(Continued)

OTHER PUBLICATIONS

Machine Translation of JP2009-155489; Kumazawa et al., published Jul. 2009.*
Extended European Search Report, dated Oct. 29, 2015, for European Application No. 13791592.2.
International Search Report (Form PCT/ISA/210) for International Application No. PCT/JP2013/063443, dated Aug. 6, 2013.
Japanese Office Action, dated Dec. 14, 2016, for Japanese Application No. 2013-102446.
Taiwanese Office Action for Taiwanese Application No. 102117601, dated Oct. 21, 2016.

*Primary Examiner* — Jeffrey Wollschlager
(74) *Attorney, Agent, or Firm* — Birch, Stewart, Kolasch & Birch, LLP

(57) ABSTRACT

A sheet for thermoforming made of a polylactic acid resin composition containing a polylactic acid-based resin, a plasticizer, and a crystal nucleating agent, wherein the sheet has a thickness of from 0.1 to 1.5 mm, and wherein Re (cal) calculated by the following formula (A): Re (cal)=Re (obs)/$d \times 10^{-6}$ (A), wherein Re (obs) is a phase difference (nm) measured at a wavelength selected from wavelengths of from 380 to 780 nm, and d is a thickness (mm) of the sheet, is within the range of $0.001 \times 10^{-3} \leq \text{Re(cal)} \leq 1 \times 10^{-3}$. The sheet for thermoforming of the present invention has a wide moldable temperature region, so that the sheet can be suitably used in various applications such as food containers, packaging materials for daily sundries and household electric appliances, industrial trays of industrial parts, and the like.

4 Claims, 1 Drawing Sheet

(56) References Cited

U.S. PATENT DOCUMENTS

| | | | |
|---|---|---|---|
| 2009/0131566 A1* | 5/2009 | Uradnisheck | C08L 67/04 524/114 |
| 2009/0186990 A1* | 7/2009 | Inui | C08J 5/18 525/411 |
| 2009/0278279 A1* | 11/2009 | Uradnisheck | B29C 51/428 264/210.1 |
| 2010/0104882 A1* | 4/2010 | Yamamura | B32B 27/36 428/480 |
| 2011/0028629 A1* | 2/2011 | Yamamura | C08J 5/18 524/394 |
| 2011/0224342 A1* | 9/2011 | Masuda | C08J 5/18 524/148 |
| 2012/0296017 A1 | 11/2012 | Tsuboi et al. | |
| 2013/0261214 A1 | 10/2013 | Okutsu et al. | |
| 2013/0287903 A1 | 10/2013 | Okutsu et al. | |
| 2014/0296399 A1 | 10/2014 | Tsuboi et al. | |

FOREIGN PATENT DOCUMENTS

| | | |
|---|---|---|
| JP | 2006-243610 A | 9/2006 |
| JP | 2007-130895 A | 5/2007 |
| JP | 2007-246624 A | 9/2007 |
| JP | 2009-62410 A | 3/2009 |
| JP | 2009-249443 A | 10/2009 |
| WO | WO 03/042302 A1 | 5/2003 |
| WO | WO 2008/114871 A1 | 9/2008 |
| WO | WO 2011/096299 A1 | 8/2011 |
| WO | WO2012023589 * | 2/2012 |
| WO | WO 2012/081532 A1 | 6/2012 |
| WO | WO 2012/108425 A1 | 8/2012 |

* cited by examiner

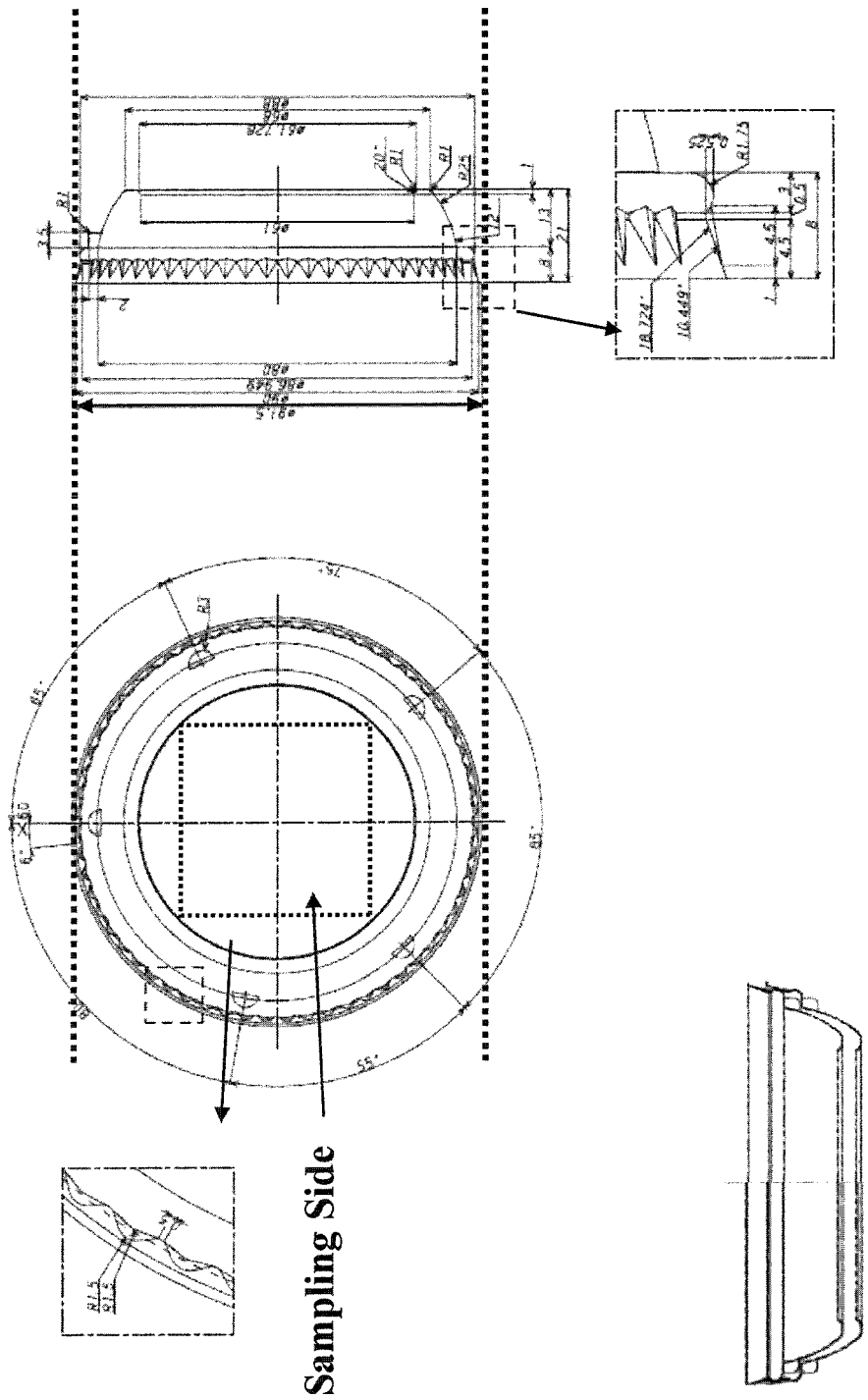

POLYLACTIC ACID RESIN SHEET FOR THERMAL MOLDING USE

FIELD OF THE INVENTION

The present invention relates to a polylactic acid resin sheet for thermoforming. More specifically, the present invention relates to a sheet made of a polylactic acid resin composition, which can be suitably used in molded articles such as packs and trays for daily sundries, cosmetics, household electric appliance parts, and the like, a method for producing the sheet, a molded article produced by molding the sheet, and a method for processing the sheet.

BACKGROUND OF THE INVENTION

Polylactic acid resins have some features that polylactic acid resins are inexpensive because the polylactic acid resins are produced from L-lactic acid used as a raw material according to a fermentation method from sugars extracted from maize, potato or the like, that the raw materials are derived from plants from which the amount of carbon dioxide discharged is very small, and that the resins have the properties of being strongly rigid and highly transparent, so that the utilization of the polylactic acid resins is expected at present.

For example, it is reported in Patent Publication 1 that a polylactic acid is combined with a particular plasticizer, e.g. a succinic acid ester, and a particular crystal nucleating agent, e.g. an organic crystal nucleating agent, thereby promoting crystallization in thermoforming while maintaining transparency, whereby a molded article having excellent heat resistance or the like is obtained.

In addition, Patent Publication 2 discloses that a film made of an aliphatic polyester-based resin is found to have a small change in double refraction due to an external force, so that the film is suitably used as a polarized plate protection film which is usable in displays such as liquid crystal displays and plasma displays.

PRIOR ART REFERENCES

Patent Publications

Patent Publication 1: Japanese Patent Laid-Open No. 2007-130895
Patent Publication 2: Japanese Patent Laid-Open No. 2006-243610

SUMMARY OF THE INVENTION

The present invention relates to the following [1] to [8]:

[1] a sheet for thermoforming made of a polylactic acid resin composition containing a polylactic acid-based resin, a plasticizer, and a crystal nucleating agent, wherein the sheet has a thickness of from 0.1 to 1.5 mm, and wherein Re (cal) calculated by the following formula (A):

$$Re(cal) = Re(obs)/d \times 10^{-6} \quad (A)$$

wherein Re (obs) is a phase difference (nm) measured at a wavelength selected from wavelengths of from 380 to 780 nm, and d is a thickness (mm) of the sheet, is within the range of $0.001 \times 10^{-3} \leq Re\,(cal) \leq 1 \times 10^{-3}$;

[2] a method for producing a sheet for thermoforming, including the following steps (I) to (III):

step (I): extruding a polylactic acid resin composition from an extruder at a temperature of from 170° to 240° C. to prepare a sheet molded article;

step (II): providing the sheet molded article obtained in the step (I) into contact with a cooling roller at a temperature of lower than 40° C., to cool the sheet molded article to a sheet surface temperature of from 0° to 50° C.; and step (III): winding up the sheet molded article from the cooling roller in the step (II) under the condition that a stretching ratio is 12% or less, wherein the sheet for thermoforming has a thickness of from 0.1 to 1.5 mm, made of the polylactic acid resin composition containing a polylactic acid-based resin, and a plasticizer in an amount of from 1 to 20 parts by weight and a crystal nucleating agent in an amount of from 0.01 to 1 part by weight, based on 100 parts by weight of the polylactic acid-based resin;

[3] a transparent molded article made of a polylactic acid resin composition, the transparent molded article having a relative crystallinity of 80% or more, produced by subjecting a sheet for thermoforming as defined in the above [1] to vacuum molding or pressure molding;

[4] a packaging material or food container, made of a molded article as in the above [3];

[5] a method for secondary processing of a sheet, characterized by subjecting a sheet for thermoforming as defined in the above [1] to vacuum molding or pressure molding;

[6] use of a sheet for thermoforming as defined in the above [1] as a thermoformed article;

[7] use of a sheet for thermoforming as defined in the above [1] as a packaging material; and

[8] use of a sheet for thermoforming as defined in the above [1] as a food container.

BRIEF DESCRIPTION OF THE DRAWINGS

FIG. 1 is a schematic view showing a mold used in Examples.

DETAILED DESCRIPTION OF THE INVENTION

A crystallization temperature of a resin composition obtained is lowered by blending a polylactic acid resin with a plasticizer and a crystal nucleating agent; therefore, there are some disadvantages in a case where a sheet made of the resin composition is subjected to vacuum molding or pressure molding that a moldable temperature region is narrow, and that the state, e.g. fittability, of a formed article (molded article) is worsened, thereby making it disadvantageous in moldability.

In addition, a sheet for thermoforming made of a resin composition prepared by blending a polylactic acid resin with a plasticizer and a crystal nucleating agent is usually subjected to heating in the pre-heating step before molding to a temperature equal to or higher than a glass transition temperature Tg, and thereafter subjected to vacuum molding, thereby closely adhering the sheet to a mold at a high temperature, so that the sheet is allowed to complete crystallization while molding. Therefore, the sheet for thermoforming of the present invention containing a plasticizer and a crystal nucleating agent is more likely to allow progress of crystallization even by pre-heating, so that the sheet is more likely to have some disadvantages such as stretching failure in vacuum molding in a high-temperature mold, in other words the disadvantages such as a narrowed moldable temperature region. On the other hand, in cases of sheets without containing a crystal nucleating agent, or without containing a crystal nucleating agent and a plasticizer, as in the polarized plate protecting films usable in various displays disclosed in Patent Publication 2, crystallization that would inhibit stretchability during thermoforming is less likely to progress during pre-heating or within a mold. Accordingly, to begin with, in Patent Publication 2, the disadvantages of a moldable temperature region as in the present invention would not arise. Further, in a case of film molding as in Patent Publication 2, since stretchability is an important physical property, a crystal nucleating agent would not be usually used, so that the disadvantages in thermoforming property, e.g. a moldable temperature region, as in the present invention would not be present.

The present invention relates to a sheet made of a polylactic acid resin composition having a wide moldable temperature region, and excellent thermoforming property, a method for producing a sheet defined, a molded article produced by molding a sheet defined, and a method for processing a sheet defined.

The sheet for thermoforming made of a polylactic acid resin composition of the present invention has a wide moldable temperature region and excellent moldability, so that a molded article having excellent external appearance can be provided.

The sheet for thermoforming of the present invention is made of a polylactic acid resin composition containing a polylactic acid-based resin, a plasticizer, and a crystal nucleating agent, the sheet having a thickness of from 0.1 to 1.5 mm, preferably 0.15 mm or more, and more preferably 0.2 mm or more, and preferably 1.2 mm or less, more preferably 1.0 mm or less, even more preferably 0.7 mm or less, even more preferably 0.4 mm or less, and even more preferably 0.3 mm or less. In addition, it is characterized in that the sheet has a thickness of preferably from 0.15 to 1.2 mm, more preferably from 0.15 to 1.0 mm, even more preferably from 0.2 to 0.7 mm, still even more preferably from 0.2 to 0.4 mm, and still even more preferably from 0.2 to 0.3 mm, and that the sheet has a phase difference Re (cal) calculated by the following formula (A):

$$Re(cal)=Re(obs)/d \times 10^{-6} \quad (A)$$

wherein Re (obs) is a phase difference (nm) measured at a wavelength selected from wavelengths of from 380 to 780 nm, and d is a thickness (mm) of the sheet,
within the range of $0.001 \times 10^{-3} \leq Re\ (cal) \leq 1 \times 10^{-3}$, preferably $0.02 \times 10^{-3} \leq Re\ (cal) \leq 1.0 \times 10^{-3}$, more preferably $0.03 \times 10^{-3} \leq Re\ (cal) \leq 0.8 \times 10^{-3}$, even more preferably $0.03 \times 10^{-3} \leq Re\ (cal) \leq 0.50 \times 10^{-3}$, even more preferably $0.03 \times 10^{-3} \leq Re\ (cal) \leq 0.30 \times 10^{-3}$, even more preferably $0.03 \times 10^{-3} \leq Re\ (cal) \leq 0.15 \times 10^{-3}$, and even more preferably $0.03 \times 10^{-3} \leq Re\ (cal) \leq 0.10 \times 10^{-3}$.

A crystalline polyester is usually caused to have a molecular orientation by stretching at a temperature equal or higher than a glass transition temperature Tg. Regarding this molecular orientation, for example, in the field of so-called films such as polarized films, a phase difference is generally used as an index in production management and quality control thereof. However, in the field of so-called a sheet having a thickness of 0.1 mm or more, for example, a stretching proportion in the formation of extruded sheets is generally low, so that a phase difference is not considered.

However, the present inventors have found in the thermoforming of a polylactic acid resin composition that differences in phase difference in sheets for thermoforming greatly influence thermoforming property, in other words, thermoforming property can be greatly improved by adjusting various conditions in the formation of sheets so as to keep a phase difference within a certain range and forming a sheet. The present invention has been perfected thereby. Here, a phase difference as used herein is a phase difference due to double refraction caused when the light transmits through a sheet, which is a so-called retardation, and specifically, the phase difference is measured using a polarized light having a wavelength selected from wavelengths of from 380 to 780 nm, which can be measured with a commercially available phase difference measurement instrument. Here, in the measurement of phase difference of the polylactic acid resin composition in the present invention, hardly any dependencies on wavelengths in the polarized light used in the measurement are observed. Therefore, this measurement of phase difference may be carried out at any wavelengths selected from wavelengths of from 380 to 780 nm that are used in the ordinary spectroscopic measurement. In Examples set forth below, for example, a measurement of phase difference at a wavelength of 590 nm is exemplified, without limiting the method thereto.

Each of the components will be described hereinbelow.

[Polylactic Acid Resin Composition]

[Polylactic Acid-Based Resin]

The polylactic acid-based resin includes commercially available polylactic acid resins, for example, LACEA H-100, H-280, H-400, H-440, etc. manufactured by Mitsui Chemicals, Inc., Nature Works PLA/NW3001D and NW4032D manufactured by Nature Works LLC, and Ecoplastic U'z S-09, S-12, S-17, etc. manufactured by TOYOTA MOTOR CORPORATION; and polylactic acid resins synthesized from lactic acid and lactides. A polylactic acid resin having an optical purity of 90% or more is preferred, from the viewpoint of improving strength and heat resistance, and, for example, a polylactic acid resin such as NW4032D, manufactured by Nature Works LLC having a relative large molecular weight and a high optical purity is preferred.

In addition, in the present invention, as the polylactic acid-based resin, a stereocomplex polylactic acid, composed of two kinds of polylactic acids, each obtained from a lactic acid component containing an isomer different from one another as a main component, may be used, from the viewpoint of satisfying both strength and flexibility of the polylactic acid resin composition, and improving heat resistance and transparency.

One polylactic acid constituting the stereocomplex polylactic acid [hereinafter referred to as "polylactic acid (A)"] contains L-form in an amount of from 90 to 100% by mol, and other component including D-form in an amount of from 0 to 10% by mol. The other polylactic acid [hereinafter referred to as "polylactic acid (B)"] contains D-form in an amount of from 90 to 100% by mol, and other component including L-form in an amount of from 0 to 10% by mol. Other components besides the L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in the molecule.

The polylactic acid (A) and the polylactic acid (B) in the stereocomplex polylactic acid are in a weight ratio, i.e. polylactic acid (A)/polylactic acid (B), of preferably from 10/90 to 90/10, more preferably from 20/80 to 80/20, and even more preferably from 40/60 to 60/40.

In addition, the polylactic acid-based resin in the present invention may be contained as a polymer alloy formed by a blend of the polylactic acid resin with biodegradable polyester resins other than the polylactic acid resins, or with non-biodegradable resins such as polypropylene.

The content of the polylactic acid-based resin is preferably 50% by weight or more, more preferably 60% by weight or more, and even more preferably 70% by weight or more, of the polylactic acid resin composition, from the viewpoint of biodegradability.

[Plasticizer]

The plasticizer in the present invention is not particularly limited, and includes known ones, including, for example, polycarboxylic acid esters such as phthalic acid esters such as dioctyl phthalate, succinic acid esters such as dioctyl succinate, and adipic acid esters such as dioctyl adipate; aliphatic acid esters of aliphatic polyols such as glycerol; and the like. From the viewpoint of improving transparency, heat resistance, and bleeding resistance of the polylactic acid resin composition, it is preferable that the plasticizer contains a compound represented by the formula (1):

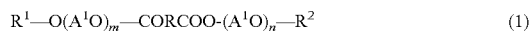

$$R^1\text{—}O(A^1O)_m\text{—}CORCOO\text{-}(A^1O)_n\text{—}R^2 \quad (1)$$

wherein $R^1$ and $R^2$ are an alkyl group having from 1 to 4 carbon atoms or a benzyl group, wherein $R^1$ and $R^2$ may be identical or different; R is an alkylene group having from 1 to 4 carbon atoms; $A^1$ is an alkylene group having 2 or 3 carbon atoms, wherein m or n number of $A^1$'s may be identical or different; and each of m and n is the number showing an average number of moles of oxyalkylene groups added that satisfies $0 \le m \le 5$, $0 \le n \le 5$, and $1 \le m+n \le 8$.

Since the carboxylic acid ester represented by the formula (1) has a sufficient molecular weight and thermal stability, and has a high affinity to the polylactic acid-based resin, some effects that the carboxylic acid ester has excellent volatile resistance, and is capable of giving flexibility to the composition without inhibiting its transparency are exhibited.

$R^1$ and $R^2$ in the formula (1) are an alkyl group having from 1 to 4 carbon atoms, or a benzyl group. The alkyl group having from 1 to 4 carbon atoms may be linear or branched. Specific examples include a methyl group, an ethyl group, a propyl group, an isopropyl group, a butyl group, an isobutyl group, and the like. Among them, the alkyl groups having from 1 to 2 carbon atoms, i.e. a methyl group and an ethyl group, are preferred, from the viewpoint of improving affinity to the polylactic acid-based resin. Here, $R^1$ and $R^2$ may be identical or different. In addition, benzyl group is preferred, from the viewpoint of improving volatile resistance.

R in the formula (1) is an alkylene group having from 1 to 4 carbon atoms. The alkylene group having from 1 to 4 carbon atoms may be linear or branched, and specifically includes a methylene group, an ethylene group, a propylene group, an isopropylene group, a butylene group, an isobutylene group, a tetramethylene group, and the like. Among them, an alkylene group having from 2 to 3 carbon atoms, i.e. an ethylene group, a propylene group, or an isopropylene group, is preferred, and an ethylene group is more preferred, from the viewpoint of improving affinity to the polylactic acid-based resin and plasticization efficiency.

$A^1$ in the formula (1) is an alkylene group having 2 or 3 carbon atoms, and $A^1O$ is an oxyalkylene group. The alkylene group having 2 or 3 carbon atoms may be linear or branched, and includes an ethylene group, a propylene group, an isopropylene group and the like. Here, m number of $A^1$ and n number of $A^1$ may be identical or different.

Each of m and n in the formula (1) is the number showing an average number of moles of oxyalkylene groups added that satisfies $0 \le m \le 5$, $0 \le n \le 5$, and $1 \le m+n \le 8$. In the present invention, m and n preferably satisfy $0 \le m \le 5$, $0 \le n \le 5$, and $4 \le m+n \le 8$, more preferably $0 \le m \le 5$, $0 \le n \le 5$, and $6 \le m+n \le 8$, and even more preferably each of m and n is 3, from the viewpoint of improving affinity to the polylactic acid-based resin and plasticization efficiency.

The compound represented by the formula (1) has an average molecular weight of preferably 250 or more, more preferably from 250 to 700, even more preferably from 300 to 600, and still even more preferably from 330 to 500, from the viewpoint of improving volatile resistance, bleeding resistance, and plasticization efficiency. Here, the average molecular weight of the plasticizer as used herein can be obtained by obtaining a saponification value in accordance with a method prescribed in JIS K0070, and calculating according to the following formula:

$$\text{Average Molecular Weight} = 56,108 \times \frac{\text{Number of Ester Groups in One Molecule}}{\text{Saponification Value}}$$

Specific examples of the carboxylic acid ester represented by the formula (1) include, for example, diesters obtained from saturated dicarboxylic acids such as malonic acid, succinic acid, glutaric acid, 2-methylsuccinic acid, and adipic acid, and polyethylene glycol monoalkyl ethers such as diethylene glycol monomethyl ether, diethylene glycol monoethyl ether, triethylene glycol monomethyl ether, triethylene glycol monoethyl ether, and tetraethylene glycol monomethyl ether, or benzyl alcohol. Among them, succinic acid esters are preferred, and a diester obtained from succinic acid and triethylene glycol monomethyl ether is more preferred, from the viewpoint of improving bleeding resistance and plasticization efficiency. In addition, an ester compound obtained from adipic acid and a mixture of diethylene glycol monomethyl ether/benzyl alcohol, weight ratio of which is 1/1, is preferred, from the viewpoint of improving volatile resistance.

The carboxylic acid ester represented by the formula (1) may be commercially available products, or those synthesized in accordance with known production methods. For example, the carboxylic acid ester can be produced in accordance with a method as disclosed in Japanese Patent Laid-Open No. 2006-176748.

In addition, in the present invention, in the secondary processability, especially thermoforming, of the polylactic acid resin composition, it is preferable that the polylactic acid resin composition contains a compound represented by the formula (4):

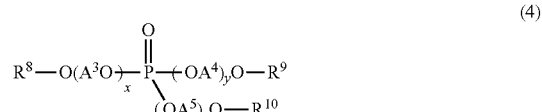

$$R^8\text{—}O(A^3O)_x\text{—}\underset{\underset{(OA^5)_zR^{10}}{|}}{\overset{\overset{O}{\|}}{P}}\text{—}(OA^4)_yO\text{—}R^9 \quad (4)$$

wherein each of $R^8$, $R^9$, and $R^{10}$ is independently an alkyl group having from 1 to 4 carbon atoms; each of $A^3$, $A^4$, and $A^5$ is independently an alkylene group having 2 or 3 carbon atoms; each of x, y, and z is independently a positive number showing the number of average moles of an oxyalkylene group added, wherein x+y+z is the number satisfying exceeding 3 and 12 or less, from the viewpoint of improving stretchability capable of molding according to the shape of a mold.

Since the phosphoric ester represented by the formula (4) has not only excellent affinity with a polylactic acid-based resin but also very high plasticization efficiency as a plasticizer, some effects are exhibited such as a moldable temperature region in secondary processability, especially thermoforming, is widened, and the crystallization velocity is improved, thereby giving a thermoformed article having excellent fittability without inhibiting transparency.

The compound represented by the formula (4) is a polyether-form phosphoric triester, which may have a symmetric structure or an asymmetric structure, and the phosphoric triester having a symmetric structure is preferred, from the viewpoint of simplicity in the production.

Each of $R^8$, $R^9$, and $R^{10}$ is independently an alkyl group having from 1 to 4 carbon atoms, which may be linear or branched. Specific examples include a methyl group, an ethyl group, a propyl group, an isopropyl group, a butyl group, and an isobutyl group, and an ethyl group, a propyl group, or a butyl group is preferred, and an ethyl group is more preferred.

Each of $A^3$, $A^4$, and $A^5$ is independently an alkylene group having 2 or 3 carbon atoms, which may be linear or branched. Specific examples include an ethylene group, an n-propylene group, and an isopropylene group. Also, $A^3$, $A^4$, and $A^5$ form oxyalkylene groups, i.e. alkylene oxides, with an adjoining oxygen atom to form a repeating structure in the compound represented by the formula (4).

Each of x, y, and z is independently a positive number showing the number of average moles of oxyalkylene groups added, wherein x+y+z satisfies the number that exceeds 3 and is equal to or less than 12. Among them, x, y, and z are positive numbers, wherein it is preferable that x+y+z satisfies the number that exceeds 3 and is less than 12, more preferably the number that exceeds 4 and is less than 12, and even more preferably the number of equal to or greater than 6 and equal to or less than 9, from the viewpoint of giving the polylactic acid-based resin sufficient secondary processability, and inhibiting bleed-out in the molded article obtained.

Since the phosphoric ester represented by the formula (4) also has a sufficient molecular weight and thermal stability, and has a high affinity to the polylactic acid-based resin as in the carboxylic acid ester represented by the formula (1), some effects that the phosphoric ester has excellent volatile resistance, and is capable of giving flexibility to the composition without inhibiting its transparency are exhibited.

Specific examples of the compound represented by the formula (4) include symmetric polyether-form phosphoric triesters such as tris(ethoxyethoxyethyl)phosphate represented by the formula (5):

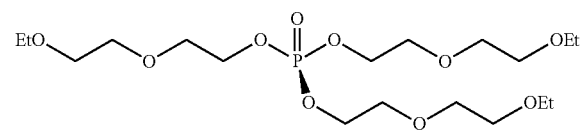

(5)

wherein in the formula (4) all of $R^8$, $R^9$, and $R^{10}$ are ethyl groups, all of $A^3$, $A^4$, and $A^5$ are ethylene groups, all of x, y, and z are 2, and x+y+z=6, tris(methoxyethoxyethyl)phosphate, tris(propoxyethoxyethyl)phosphate, tris(butoxyethoxyethyl)phosphate, tris(methoxyethoxyethoxyethyl) phosphate, and tris(ethoxyethoxyethoxyethyl)phosphate; and asymmetric polyether-form phosphoric triesters such as bis(ethoxyethoxyethyl)methoxyethoxyethyl phosphate and bis(methoxyethoxyethyl)ethoxyethoxyethyl phosphate; or an asymmetric polyether-form phosphoric ester obtained by triester-phosphorylating a mixture of a polyoxyethylene adduct or polyoxypropylene adduct of an alcohol having from 1 to 4 carbon atoms so as to satisfy the formula (4). Tris(ethoxyethoxyethyl)phosphate is preferred, from the viewpoint that the polylactic acid-based resin is given with sufficient secondary processability, and that the safety against skin has been confirmed in a case where the sheet is used in a food container.

The compound represented by the formula (4) may be commercially available products, or those synthesized in accordance with known production methods. For example, the compound can be synthesized in accordance with a method as disclosed in Japanese Patent Laid-Open No. Hei-10-17581.

In addition, in the present invention, it is preferable that the polylactic acid resin composition contains a plasticizer represented by the formula (6):

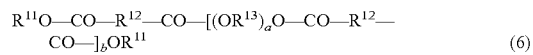

(6)

wherein $R^{11}$ is an alkyl group having from 1 to 4 carbon atoms; $R^{12}$ is an alkylene group having from 2 to 4 carbon atoms; $R^{13}$ is an alkylene group having from 2 to 6 carbon atoms; a is the number of from 1 to 6; and b is the number of from 1 to 12, with proviso that all the $R^{12}$'s may be identical or different, and that all the $R^{13}$'s may be identical or different, from the viewpoint of improving secondary processability of the polylactic acid resin composition, especially stretchability capable of molding according to the shape of a mold in thermoforming.

Since the compound represented by the formula (6) has a sufficient molecular weight and thermal stability, and has a high affinity to the polylactic acid-based resin, some effects that the compound has excellent volatile resistance, and is capable of giving flexibility to the composition without inhibiting its transparency are exhibited.

Specific examples of the compound represented by the formula (6) include
an ester in which $R^{11}$ is a methyl group, $R^{12}$ is an ethylene group, $R^{13}$ is an ethylene group, a is 2, and b is 4.3;
an ester in which $R^{11}$ is an ethyl group, $R^{12}$ is a 1,4-butylene group, $R^{13}$ is a 1,3-propylene group, a is 1, and b is 2;
an ester in which $R^{11}$ is a butyl group, $R^{12}$ is a 1,3-propylene group, $R^{13}$ is an ethylene group, a is 3, and b is 1.5;
an ester in which $R^{11}$ is a methyl group, $R^{12}$ is an ethylene group, $R^{13}$ is a 1,6-hexylene group, a is 1, and b is 3;
an ester in which $R^{11}$ is a methyl group, $R^{12}$ is an ethylene group, $R^{13}$ is a 1,2-propylene group, a is 1, and b is 6.5;
an ester in which $R^{11}$ is a methyl group, $R^{12}$ is an ethylene group, $R^{13}$ is a 2-methyl-1,3-propylene group, a is 1, and b is 3;
and the like. These compounds may be contained alone or in two or more kinds. Among them, compounds in which all the $R^{11}$'s are methyl groups, $R^{12}$ is an ethylene group or a 1,4-butylene group, $R^{13}$ is an ethylene group, a 1,3-propylene group, or a 1,2-propylene group, a is the number of from 1 to 3, and b is the number of from 1 to 8 are preferred, and compounds in which all the $R^{11}$'s are methyl groups, $R^{12}$ is an ethylene group or a 1,4-butylene group, $R^{13}$ is an ethylene group, a 1,3-propylene group, or a 1,2-propylene group, a is the number of from 1 to 2, and b is the number of from 1.8 to 7 are more preferred.

From the viewpoint of improving transparency, heat resistance, and bleeding resistance of the polylactic acid resin composition, the content of the plasticizer in the polylactic acid resin composition is preferably 1 part by weight or more, and preferably 40 parts by weight or less, more preferably 30 parts by weight or less, even more preferably 20 parts by weight or less, even more preferably 10 parts by weight or less, even more preferably 7 parts by weight or less, and even more preferably 5 parts by weight or less, based on 100 parts by weight of the polylactic acid-based resin. Also, the content is preferably from 1 to 40 parts by weight, more preferably from 1 to 30 parts by weight, even more preferably from 1 to 20 parts by weight, even more preferably from 1 to 10 parts by weight, even more preferably from 1 to 7 parts by weight, and even more preferably from 1 to 5 parts by weight. It is preferable that each of the contents of the plasticizers represented by the formulas (1), (4), and (6) is within the range defined above. Further, in a case where heat resistance of an amorphous sheet is needed, the higher the glass transition temperature of the polylactic acid resin composition the better, and the content of the plasticizer in the polylactic acid resin composition is preferably 1 part by weight or more, and preferably 10 parts by weight or less, more preferably 8 parts by weight or less, even more preferably 7 parts by weight or less, and even more preferably 5 parts by weight or less, based on 100 parts by weight of the polylactic acid-based resin. In addition, the content is preferably from 1 to 10 parts by weight, more preferably from 1 to 8 parts by weight, even more preferably from 1 to 7 parts by weight, and even more preferably from 1 to 5 parts by weight. In addition, the content of the carboxylic acid ester represented by the formula (1) or the phosphoric ester represented by the formula (4), or the compound represented by the formula (6) in the entire plasticizers is preferably 60% by weight or more, more preferably 70% by weight or more, even more preferably 90% by weight or more, even more preferably substantially 100% by weight, and even more preferably 100% by weight, from the viewpoint of improving bleeding resistance, plasticization efficiency, and secondary processability. Here, the content of the carboxylic acid ester represented by the formula (1) or the phosphoric ester represented by the formula (4), and the compound represented by the formula (6), i.e. the compound represented by the formula (1), (4) or (6), means a total content of the compound represented by the formula (1), the compound represented by the formula (4), and the compound represented by the formula (6), and the entire plasticizers mean a collective of the compound represented by the formula (1) and the compound represented by the formula (4), the compound represented by the formula (6), and other plasticizers that are contained in the composition.

In addition, the content of the carboxylic acid ester represented by the formula (1) in the polylactic acid resin composition is preferably 1 part by weight or more, and preferably 30 parts by weight or less, more preferably 20 parts by weight or less, even more preferably 10 parts by weight or less, even more preferably 8 parts by weight or less, and even more preferably 6 parts by weight or less, based on 100 parts by weight of the polylactic acid-based resin, from the viewpoint of improving bleeding resistance, secondary processability, and heat resistance. In addition, the content is preferably from 1 to 30 parts by weight, more preferably from 1 to 20 parts by weight, even more preferably from 1 to 10 parts by weight, even more preferably from 1 to 8 parts by weight, and even more preferably from 1 to 6 parts by weight. When the content is 1 part by weight or more, the secondary processability becomes excellent, and when the content is 30 parts by weight or less, heat resistance and bleeding resistance can be made excellent. The content of the phosphoric ester represented by the formula (4) is preferably 0.5 parts by weight or more, and more preferably 1.0 part by weight or more, and preferably 20 parts by weight or less, more preferably 15 parts by weight or less, even more preferably 10 parts by weight or less, even more preferably 5 parts by weight or less, and even more preferably 4 parts by weight or less, based on 100 parts by weight of the polylactic acid-based resin. In addition, the content is preferably from 0.5 to 20 parts by weight, more preferably from 0.5 to 15 parts by weight, even more preferably from 1.0 to 10 parts by weight, even more preferably from 1.0 to 5 parts by weight, and even more preferably from 1 to 4 parts by weight. When the content is 0.5 parts by weight or more, the effects of improving plasticization of the compound represented by the formula (4) are excellently exhibited, and when the content is 20 parts by weight or less, the resin composition would not be too soft, thereby making the handling property of the secondary processing excellent. The content of the compound represented by the formula (6) is preferably 1 part by weight or more, and preferably 30 parts by weight or less, more preferably 20 parts by weight or less, and even more preferably 10 parts by weight or less, based on 100 parts by weight of the polylactic acid-based resin. Also, the content is preferably from 1 to 30 parts by weight, more preferably from 1 to 20 parts by weight, and even more preferably from 1 to 10 parts by weight. When the content is 1 part by weight or more, the effects of improving plasticization of the compound represented by the formula (6) are excellently exhibited, and when the content is 30 parts by weight or less, the resin composition would not be too soft, thereby making handling property in the secondary processing excellent.

[Crystal Nucleating Agent]

It is preferable that the crystal nucleating agent in the present invention contains a compound represented by the formula (2):

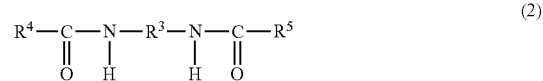

wherein $R^3$ is an alkylene group having from 1 to 10 carbon atoms; and $R^4$ and $R^5$ are a linear or branched alkyl group having from 5 to 21 carbon atoms, which may have a substituent, wherein $R^4$ and $R^5$ may be identical or different.

The compound represented by the formula (2) has an effect of producing crystal nuclei of the polylactic acid resin in a vast number, and consequently the polylactic acid resin is formed into fine crystals, and whereby an effect of improving transparency is exhibited.

$R^3$ in the formula (2) is an alkylene group having from 1 to 10 carbon atoms, and the alkyl group may be linear or branched. Specific examples include an ethylene group, a propylene group, a tetramethylene group, a hexamethylene group, a metaxylylene group, and the like. Among them, an ethylene group, a hexamethylene group, or a metaxylylene group is preferred, and an ethylene group is more preferred, from the viewpoint of improving transparency of the polylactic acid resin composition.

$R^4$ and $R^5$ in the formula (2) are a linear or branched alkyl group having from 5 to 21 carbon atoms, which may have a substituent, and the alkyl group may be saturated or unsaturated, wherein $R^4$ and $R^5$ may be identical or different. The substituent for $R^4$ and $R^5$ includes a hydroxyl group and the like. Specific examples of $R^4$ and $R^5$ are illustrated by a heptyl group, a nonyl group, an undecyl group, a tridecyl group, a pentadecyl group, a heptadecyl group, a heneicosyl group, a heptadecyl group, a 11-hydroxypentadecyl group, and the like. Among them, an undecyl group, a tridecyl group, a pentadecyl group, a heptadecyl group, a heptadecyl group, a 11-hydroxypentadecyl group, and a 11-hydroxyheptadecyl group are preferred, and a 11-hydroxyheptadecyl group is more preferred, from the viewpoint of improving transparency of the polylactic acid resin composition.

Specific examples of the compound represented by the formula (2) include diamides obtained from fatty acids which may have a substituent, that have from 8 to 22 carbon atoms in total, and diamines, such as ethylenediamine, 1,3-propanediamine, 1,4-butanediamine, 1,5-pentanediamine, 1,6-hexanediamine, or m-xylenediamine. Among them, ethylenebis fatty acid amides, propylenebis fatty acid amides, butylenebis fatty acid amides, hexamethylenebis fatty acid amides, and metaxylenebis fatty acid amides are preferred, ethylenebis palmitamide, ethylenebis stearamide, ethylenebis oleamide, ethylenebis 12-hydroxystearamide, hexamethylenebis 12-hydroxystearamide, and metaxylenebis 12-hydroxystearamide are more preferred, and ethylenebis oleamide, ethylenebis 12-hydroxystearamide, hexamethylenebis 12-hydroxystearamide, and metaxylenebis 12-hydroxystearamide are even more preferred, from the viewpoint of improving transparency of the polylactic acid resin composition.

The compound represented by the formula (2) may be a commercially available product, or a compound synthesized in accordance with a known production method.

In the present invention, other crystal nucleating agents that are known aside from the crystal nucleating agent represented by the formula (2) can be used, within the range that would not impair the effects of the present invention. Other crystal nucleating agents are exemplified by natural or synthetic silicate compounds, metal salts such as titanium oxide, barium sulfate, calcium tripolyphosphate, calcium carbonate, and sodium phosphate, inorganic compounds such as kaolinite, halloysite, talc, smectite, vermiculite, and mica, and organic metal salts such as metal salts of phenylphosphonic acid, and the like. The content of these other crystal nucleating agents is preferably 1 part by weight or less, more preferably 0.5 parts by weight or less, and even more preferably substantially not containing these other crystal nucleating agents, based on 100 parts by weight of the polylactic acid-based resin, from the viewpoint of not impairing the effects of the present invention. The content of the crystal nucleating agent represented by the formula (2) in the entire crystal nucleating agents is preferably 60% by weight or more, more preferably 80% by weight or more, even more preferably substantially 100% by weight, and even more preferably 100% by weight, from the viewpoint of improving transparency of the polylactic acid resin composition. Here, the entire crystal nucleating agents mean a combined mixture of the crystal nucleating agent represented by the formula (2) and other crystal nucleating agents.

In addition, the content of the crystal nucleating agent represented by the formula (2) in the polylactic acid resin composition of the present invention is preferably 0.01 parts by weight or more, more preferably 0.1 parts by weight or more, and preferably 3 parts by weight or less, more preferably 2 parts by weight or less, even more preferably 1 part by weight or less, even more preferably 0.7 parts by weight or less, and even more preferably 0.5 parts by weight or less, based on 100 parts by weight of the polylactic acid-based resin, from the viewpoint of improving compatibility against the polylactic acid resin and transparency. In addition, the content is preferably from 0.01 to 3 parts by weight, more preferably from 0.01 to 2 parts by weight, even more preferably from 0.01 to 1 part by weight, and even more preferably from 0.1 to 0.7 parts by weight. When the content is 0.01 parts by weight or more, the transparency of the polylactic acid resin composition would be excellent, and when the content is 3 parts by weight or less, the compatibility against the polylactic acid resin can be maintained, so that the transparency can be made excellent.

Furthermore, the crystal nucleating agent represented by the formula (2) is preferably 0.5 parts by weight or more, more preferably 1.0 part by weight or more, even more preferably 2 parts by weight or more, even more preferably 3.5 parts by weight or more, and preferably 50 parts by weight or less, more preferably 30 parts by weight or less, even more preferably 20 parts by weight or less, even more preferably 10 parts by weight or less, and still even more preferably 8 parts by weight or less, based on 100 parts by weight of the plasticizer represented by the formula (1), in order not to impair the effects of flexibility of the plasticizer represented by the formula (1). In addition, the crystal nucleating agent is preferably from 0.5 to 50 parts by weight, more preferably from 0.5 to 30 parts by weight, even more preferably from 1.0 to 20 parts by weight, still even more preferably from 2 to 10 parts by weight, and still even more preferably from 3.5 to 8 parts by weight. Further, the crystal nucleating agent represented by the formula (2) is preferably 0.5 parts by weight or more, more preferably 1.0 part by weight or more, even more preferably 2 parts by weight or more, and even more preferably 3.5 parts by weight or more, and preferably 50 parts by weight or less, more preferably 30 parts by weight or less, even more preferably 20 parts by weight or less, even more preferably 10 parts by weight or less, and still even more preferably 8 parts by weight or less, based on 100 parts by weight of the plasticizer represented by the formula (1), (4) or (6), in order not to impair the effects of flexibility of the plasticizer represented by the formula (1), (4), and/or (6). In addition, the content is preferably from 0.5 to 50 parts by weight, more preferably from 0.5 to 30 parts by weight, even more preferably from 1.0 to 20 parts by weight, still even more preferably from 2 to 10 parts by weight, and still even more preferably from 3.5 to 8 parts by weight.

[Nonionic Surfactant]

It is preferable that the polylactic acid resin composition according to the present invention contains a nonionic surfactant, in addition to a polylactic acid-based resin, a plasticizer, and a crystal nucleating agent mentioned above, from the viewpoint of thermoforming property and transparency.

As the nonionic surfactant in the present invention, it is preferable to contain a compound represented by the formula (3):

$$R^6-O(A^2O)_p-R^7 \qquad (3)$$

wherein $R^6$ is an alkyl group having from 8 to 22 carbon atoms, an acyl group having from 8 to 22 carbon atoms in total, or a hydrogen atom; $R^7$ is a hydrogen atom, an alkyl group having from 1 to 4 carbon atoms, or an acyl group having from 2 to 4 carbon atoms in total; $A^2$ is an alkylene group having 2 or 3 carbon atoms; p is the number of average moles of an oxyalkylene group added, wherein p is the number satisfying 0≤p≤300, and wherein p number of oxyalkylene groups represented by ($A^2O$) may be identical or different, and the repeating units, when different, may be either in a block form or a random form, from the viewpoint of using in combination with a plasticizer represented by the formula (1), or with a plasticizer represented by the formula (4), whereby some effects are exhibited such as transparency in thermoforming and sufficient thermoforming property, in other words, a widener temperature range that can satisfy forming property and crystallization, can be realized.

$R^6$ in the formula (3) is an alkyl group having from 8 to 22 carbon atoms, an acyl group having from 8 to 22 carbon atoms in total, or a hydrogen atom.

The alkyl group having from 8 to 22 carbon atoms may be linear or branched, and the alkyl group may be saturated or unsaturated. Specific examples include linear alkyl groups such as an octyl group, a nonyl group, a decyl group, an undecyl group, a dodecyl group (a lauryl group), a tridecyl group, a tetradecyl group (a myristyl group), a pentadecyl group, a hexadecyl group (a cetyl group), a heptadecyl group, an octadecyl group (a stearyl group), a nonadecyl group, an eicosyl group, and a behenyl group; branched alkyl groups such as a 2-ethylhexyl group, a 2-hexyldecyl group, an isodecyl group, and an isostearyl group; unsaturated alkyl groups such as an undecenyl group and an oleyl group; and the like. The acyl group having from 8 to 22 carbon atoms in total may be saturated or unsaturated, so long as the acyl group has from 8 to 22 carbon atoms in total. The acyl group is exemplified by linear acyl groups such as an octanoyl group, a nonanoyl group, a decanoyl group, an undecanoyl group, a dodecanoyl group (a lauroyl group), a tridecanoyl group, a tetradecanoyl group, a pentadecanoyl group, a hexadecanoyl group, a heptadecanoyl group, an octadecanoyl group, a nonadecanoyl group, an eicosanoyl group, and a behenoyl group; branched acyl groups such as a 2-ethylhexanoyl group; unsaturated acyl groups originated from oleic acid; and the like.

Among them, $R^6$ in the formula (3) is preferably a saturated or unsaturated acyl group having from 8 to 22 carbon atoms in total, and more preferably a saturated or unsaturated acyl group having from 10 to 18 carbon atoms in total.

$R^7$ in the formula (3) is a hydrogen atom, an alkyl group having from 1 to 4 carbon atoms, or an acyl group having from 2 to 4 carbon atoms in total.

The alkyl group having from 1 to 4 carbon atoms may be linear or branched. Specific examples include a methyl group, an ethyl group, a propyl group, an isopropyl group, a butyl group, a sec-butyl group, and a tert-butyl group.

The acyl group having from 2 to 4 carbon atoms in total may be saturated or unsaturated. Specific examples are illustrated by an acetyl group, a propanoyl group, a butanoyl group, and the like.

Among them, $R^7$ in the formula (3), when $R^6$ is an alkyl group having from 8 to 22 carbon atoms or an acyl group having from 8 to 22 carbon atoms in total, is preferably a hydrogen atom or a methyl group, and more preferably a hydrogen atom. In addition, when $R^6$ in the formula (3) is a hydrogen atom, it is preferable that $R^7$ is also a hydrogen atom.

$A^2$ in the formula (3) is an alkylene group having from 2 or 3 carbon atoms, and $A^2O$ is an oxyalkylene group. The alkylene group having 2 or 3 carbon atoms may be linear or branched, and includes an ethylene group, a propylene group, an isopropylene group and the like, and an ethylene group or an isopropylene group is preferred. Here, p number of $A^2O$ may be identical or different. When different, the repeating units may be either in a block form or a random form, and preferably in a block form, preferably in a block form of polyoxypropylene-polyoxyethylene-polyoxypropylene or polyoxyethylene-polyoxypropylene-polyoxyethylene, and the repeating units are more preferably in a block form of polyoxypropylene-polyoxyethylene-polyoxypropylene, from the viewpoint of molding temperature range and transparency.

p in the formula (3) is an average number of moles of oxyalkylene groups added that satisfies 0≤p≤300. When $R^6$ is an alkyl group having from 8 to 22 carbon atoms, or an acyl group having from 8 to 22 carbon atoms in total, it preferably satisfies 2≤p≤50, more preferably satisfies 5≤p≤20, and even more preferably satisfies 7≤p≤12. When $R^6$ is a hydrogen atom, it preferably satisfies 10≤p≤200, and more preferably satisfies 20≤p≤100. In addition, when both of $R^6$ and $R^7$ are a hydrogen atom, it preferably satisfies 10≤p≤200, and more preferably satisfies 20≤p≤100. Furthermore, when $R^6$ is a hydrogen atom, $(A^2O)_p$ preferably contains different $A^2O$'s, among which block forms of polyoxypropylene-polyoxyethylene-polyoxypropylene or polyoxyethylene-polyoxypropylene-polyoxyethylene are more preferred, and block forms of polyoxypropylene-polyoxyethylene-polyoxypropylene are even more preferred. The number p' of $A^2O$ constituting each of the block units in that case each preferably satisfies 5≤p'≤80, and more preferably satisfies 5≤p'≤60. Moreover, the polyoxyethylene EO and the polyoxypropylene PO in that case are in a weight ratio EO/PO of preferably from 5/95 to 70/30, more preferably from 5/95 to 60/40, even more preferably from 10/90 to 50/50, even more preferably from 10/90 to 40/60, even more preferably from 10/90 to 30/70, and even more preferably from 15/85 to 25/75.

The average molecular weight of the compound represented by the formula (3) is preferably from 300 to 100,000, more preferably from 500 to 50,000, even more preferably from 500 to 10,000, even more preferably from 500 to 6,000, and even more preferably from 600 to 4,000, from the viewpoint of improving fluidity during melt-kneading of the raw materials for the polylactic acid resin composition and bleeding resistance during molding. Further, the average molecular weight is preferably from 1,000 to 6,000, more preferably from 2,000 to 6,000, and even more preferably from 3,000 to 4,000, from the viewpoint of heat resistance of the sheet in an amorphous state made of the polylactic acid resin composition.

Specific examples of the compound represented by the formula (3) include, for example, mono- or diether compounds obtained from aliphatic alcohols having from 8 to 22 carbon atoms and a polyoxyethylene glycol or polyoxypropylene glycol, or mono- or diester compounds obtained from fatty acids having from 8 to 22 carbon atoms and a polyoxyethylene glycol or polyoxypropylene glycol, and methyl ether compounds thereof. Fatty acid esters of polyoxyethylene glycol and esters obtained from fatty acids and monomethyl polyglycol ether are preferred, and monoesters obtained from long-chained fatty acids such as oleic acid and a polyglycol are more preferred, from the viewpoint of improving flexibility, and compatibility with the carboxylic acid ester represented by the formula (1), compatibility with the phosphoric ester represented by the formula (4), and compatibility with the compound represented by the formula (6).

The compound represented by the formula (3) may be a commercially available product, or a compound synthesized in accordance with a known production method may be used. Preferred commercially available products include, for example, a fatty acid polyoxyethylene glycol ester, e.g., one manufactured by Kao Corporation, EMANON Series such as "EMANON 4110". In addition, other preferred examples include a polymeric nonionic surfactant a polyoxyethylene-polyoxypropylene copolymer, e.g., one manufactured by ADEKA, under the trade name of ADEKA Pluronic, Nonion Series. A compound in which propylene oxide is subjected to addition polymerization to both terminals of the polyoxyethylene glycol, which is a so-called reverse block form of ADEKA Pluronic Nonion, is more preferred, from the viewpoint of transparency, compatibility and fluidity. Specific examples of the preferred commercially available products include, for example, one manufactured by ADEKA under the trade names of ADEKA Pluronic 25R-2, 25R-1, and the like.

In the present invention, other surfactants that are known aside from the nonionic surfactant represented by the formula (3) can be used within the range that would not impair of the effects of the present invention. The kinds of the surfactants are not particularly limited, and it is preferable to use a surfactant aside from an ionic surfactant, from the viewpoint of avoiding the degradation of the polylactic acid resin during kneading.

In addition, the content of the nonionic surfactant represented by the formula (3) in the polylactic acid resin composition of the present invention is preferably 0.1 parts by weight or more, and more preferably 0.5 parts by weight or more, and preferably 10 parts by weight or less, more preferably 5 parts by weight or less, even more preferably 3 parts by weight or less, and even more preferably 2.5 parts by weight or less, based on 100 parts by weight of the polylactic acid-based resin, from the viewpoint of improving secondary processability and bleeding resistance. Also, the content is preferably from 0.1 to 10 parts by weight, more preferably from 0.1 to 5 parts by weight, even more preferably from 0.1 to 3 parts by weight, and even more preferably from 0.5 to 2.5 parts by weight. When the content is 0.1 parts by weight or more, secondary processability would be excellent, and when the content is 10 parts by weight or less, bleeding resistance can be excellent.

Furthermore, in order not to impair the effects of flexibility of the plasticizer represented by the formula (1), the nonionic surfactant represented by the formula (3) is preferably 1 part by weight or more, more preferably 5 parts by weight or more, and even more preferably 15 parts by weight or more, and the nonionic surfactant is preferably 50 parts by weight or less, more preferably 45 parts by weight or less, and even more preferably 30 parts by weight or less, based on 100 parts by weight of a total amount of the plasticizers represented by the formula (1). Also, the content is preferably from 1 to 50 parts by weight, more preferably from 5 to 50 parts by weight, even more preferably from 5 to 45 parts by weight, and even more preferably from 15 to 30 parts by weight. Similarly, the nonionic surfactant relative to the plasticizer represented by the formula (4) is also preferably 1 part by weight or more, more preferably 5 parts by weight or more, even more preferably 10 parts by weight or more, even more preferably 30 parts by weight or more, and even more preferably 40 parts by weight or more, and preferably 300 parts by weight or less, more preferably 200 parts by weight or less, even more preferably 60 parts by weight or less, and even more preferably 50 parts by weight or less, based on 100 parts by weight of a total amount of the plasticizers represented by the formula (4). In addition, the nonionic surfactant is preferably from 1 to 50 parts by weight, more preferably from 5 to 50 parts by weight, and even more preferably from 10 to 50 parts by weight. Similarly, the nonionic surfactant relative to the plasticizer represented by the formula (6) is also preferably 1 part by weight or more, more preferably 5 parts by weight or more, and even more preferably 10 parts by weight or more, and preferably 50 parts by weight or less, based on 100 parts by weight of a total amount of the plasticizers represented by the formula (6). In addition, the nonionic surfactant is preferably from 1 to 50 parts by weight, more preferably from 5 to 50 parts by weight, and even more preferably from 10 to 50 parts by weight.

In addition, the polylactic acid resin composition of the present invention can further contain a hydrolysis inhibitor, in addition to the components mentioned above.

The hydrolysis inhibitor includes carbodiimide compounds such as polycarbodiimide compounds and monocarbodiimide compounds, and the polycarbodiimide compounds are preferred from the viewpoint of improving durability and impact resistance of the polylactic acid resin composition, and the monocarbodiimide compounds are preferred from the viewpoint of improving durability and moldability (fluidity) of the polylactic acid resin composition. It is possible that the monocarbodiimide and the polycarbodiimide are used together, from the viewpoint of even more improving durability, impact resistance, and moldability of the molded article made of the polylactic acid resin composition.

The polycarbodiimide compound includes poly(4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene and 1,5-diisopropylbenzene)polycarbodiimide, and the like. The monocarbodiimide compound includes N,N'-di-2,6-diisopropylphenylcarbodiimide, and the like.

In order to satisfy durability, impact resistance, and moldability of the molded article made of the polylactic acid resin composition, the above-mentioned carbodiimide compounds may be used alone or in a combination of two or more kinds. In addition, as the poly(4,4'-dicyclohexylmethanecarbodiimide), Carbodilite LA-1 manufactured by Nisshinbo Chemical Inc. can be purchased and used; as the poly(1,3,5-triisopropylbenzene)polycarbodiimide and poly (1,3,5-triisopropylbenzene and 1,5-diisopropylbenzene) polycarbodiimide, Stabaxol P and Stabaxol P-100, manufactured by Rhein Chemie Rheinau GmbH can be purchased and used; and as N,N'-di-2,6-diisopropylphenylcarbodiimide, Stabaxol 1 manufactured by Rhein Chemie Rheinau GmbH can be purchased and used, respectively.

The content of the hydrolysis inhibitor is preferably 0.05 parts by weight or more, and more preferably 0.10 parts by weight or more, and preferably 3 parts by weight or less, more preferably 2 parts by weight or less, and even more preferably 0.6 parts by weight or less, based on 100 parts by weight of the polylactic acid-based resin, from the viewpoint of improving transparency and moldability of the molded article made of the polylactic acid resin composition. In addition, the content is preferably from 0.05 to 3 parts by weight, more preferably from 0.05 to 2 parts by weight, and even more preferably from 0.05 to 0.6 parts by weight.

The polylactic acid resin composition according to the present invention may contain a core-shell shaped rubber, from the viewpoint of improving physical properties such as impact resistance and toughness. Specific examples thereof include (core: silicone/acrylic polymer, shell: methyl methacrylate polymer), (core: silicone/acrylic polymer, shell: methyl methacrylate/glycidyl methacrylate polymer), (core: butadiene/styrene polymer, shell: methyl methacrylate polymer), (core: acrylic polymer, shell: methyl methacrylate polymer), and the like. As a commercially available product, METABLEN S-2006, S-2100, S-2200, W-600A, manufactured by Mitsubishi Rayon, PARALOID BPM-500, manufactured by Rohm and Haas are preferred, from the viewpoint of improving transparency. The content of the core-shell shaped rubber is preferably from 1 to 30 parts by weight, and more preferably from 2 to 20 parts by weight, based on 100 parts by weight of the polylactic acid-based resin.

The polylactic acid resin composition according to the present invention can contain, as other components besides those mentioned above, a filler including an inorganic filler and an organic filler, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent or the like, within the range that would not impede the accomplishment of the objects of the present invention, in other words, within the range that would not inhibit secondary processability such as thermoforming property. In addition, similarly, other polymeric materials and other resin compositions can be added within the range that would not impede the effects of the present invention.

The polylactic acid resin composition according to the present invention can be prepared without particular limitations, so long as the resin composition contains a polylactic acid-based resin, a plasticizer, and a crystal nucleating agent. For example, the polylactic acid resin composition can be prepared by melt-kneading raw materials containing a polylactic acid-based resin, a plasticizer represented by the formula (1), the formula (4) and/or the formula (6), a crystal nucleating agent represented by the formula (2), and further optionally various additives such as a nonionic surfactant represented by the formula (3) and a hydrolysis inhibitor, with a known kneader such as a tightly closed kneader, a single-screw or twin-screw extruder, or an open roller-type kneader. After melt-kneading the components, a melt-kneaded mixture may be dried or cooled in accordance with a known method. Here, when a molten product of the polylactic acid resin composition is prepared, a supercritical gas may be allowed to be present while mixing in a molten state in order to promote plasticity of the polylactic acid resin. Here, the raw materials can also be subjected to melt-kneading after previously homogeneously blending the components with a Henschel mixer, a super mixer or the like.

The melt-kneading temperature is preferably 170° C. or higher, more preferably 175° C. or higher, and even more preferably 180° C. or higher, and preferably 240° C. or lower, more preferably 220° C. or lower, and even more preferably 210° C. or lower, from the viewpoint of improving moldability and inhibition of deterioration of the polylactic acid resin composition. Also, the melt-kneading temperature is preferably from 170° to 240° C., more preferably from 175° to 220° C., and even more preferably from 180° to 210° C. The melt-kneading time cannot be unconditionally determined because the melt-kneading time depends upon the melt-kneading temperature and the kinds of the kneaders, and the melt-kneading time is preferably from 15 to 900 seconds.

The glass transition temperature Tg of the resulting melt-kneaded mixture cannot be unconditionally determined because the glass transition temperature depends upon the contents of the compounds represented by the formulas (1) to (6), and other additives. The glass transition temperature is preferably from 30° to 60° C., more preferably from 30° to 58° C., and even more preferably from 35° to 58° C. In addition, the glass transition temperature is preferably from 40° to 58° C., and more preferably from 45° to 58° C., from the viewpoint of heat resistance of a sheet when being transported.

In addition, the cold crystallization temperature Tc of the melt-kneaded mixture cannot be unconditionally determined because the cold crystallization temperature depends upon the contents of the compounds represented by the formulas (1) to (6), and other additives. The cold crystallization temperature is preferably from 50° to 110° C., more preferably from 50° to 100° C., and even more preferably from 60° to 95° C.

The melting point Tm of the melt-kneaded mixture is preferably from 130° to 210° C., more preferably from 140° to 200° C., and even more preferably from 150° to 180° C., from the viewpoint of heat resistance and processability of the molded article.

The melt-kneaded mixture thus obtained has excellent secondary processability such as thermoforming property, so that the melt-kneaded mixture is molded into a primary processed product made of the polylactic acid resin composition, which is also referred to as a primary molded article, that can be processed into a molded article or the like having excellent heat resistance, in other words, the sheet for thermoforming of the present invention.

The sheet for thermoforming of the present invention is not particularly limited in the method for preparation, so long as the sheet has a phase difference Re (cal) defined above, and the sheet can be prepared by, for example, extrusion molding or stretching after pressure forming. Here, a phase difference Re (obs) can be effectively controlled with a kneading temperature, i.e. a temperature of an extruder, a cooling roller temperature, a wind-up speed or the like in the extrusion molding, or a sheet heating temperature (set temperature during stretching), a stretching ratio, a stretching speed, or the like, in a method of stretching after press molding, whereby a sheet having a phase difference Re (cal) within the range mentioned above can be prepared.

In extrusion molding, a polylactic acid resin composition mentioned above which is filled in a heated extruder is melted, and thereafter extruded from a T die, whereby a sheet-like molded article, which is also referred to as a sheet molded article, can be obtained. This sheet molded article is immediately brought into contact with a cooling roller to cool the molded article, and subsequently the molded article is detached from the cooling roller, and wound around with a winding roller, whereby a sheet for thermoforming of the present invention can be obtained.

Here, upon filling the extruder, the raw materials constituting the polylactic acid resin composition containing, for example, a polylactic acid-based resin, a plasticizer, and a crystal nucleating agent, and further optionally various additives may be directly filled, and melt-kneaded, or alternatively a previously melt-kneaded mixture may be filled to an extruder.

The temperature of the extruder is preferably 170° C. or higher, more preferably 175° C. or higher, and even more preferably 180° C. or higher, and preferably 240° C. or lower, more preferably 220° C. or lower, and even more preferably 210° C. or lower, from the viewpoint of homogeneously mixing a polylactic acid resin composition and inhibiting the deterioration of the polylactic acid-based resin. In addition, the temperature of the extruder is preferably from 170 to 240° C., more preferably from 175° to 220° C., and even more preferably from 180° to 210° C. Here, in the present invention, the temperature of the extruder means a barrel setting temperature of the extruder. In addition, the residence time in the extruder cannot be unconditionally determined because the residence time depends upon thickness, width, and wind-up speed of the sheet, but the residence time is preferably from 30 seconds to several minutes or so, from the viewpoint of avoiding deterioration due to heat.

Also, the temperature of the cooling roller is preferably set at a temperature lower than Tg of the polylactic acid resin composition, from the viewpoint of obtaining a sheet in an amorphous state or a semi-amorphous state, and the temperature is specifically preferably lower than 40° C., more preferably 30° C. or lower, and even more preferably 20° C. or lower. Here, as to the amorphous state and the semi-crystalline state as used herein, a case where a relative crystallinity calculated by the following formula is less than 60% is defined as an amorphous state, and a case where a relative crystallinity is 60% or more and less than 80% is defined as a semi-crystalline state. Accordingly, the sheet in an amorphous state or semi-crystalline state means a sheet having a relative crystallinity of less than 80%.

Relative Crystallinity (%)={($\Delta Hm-\Delta Hcc$)/$\Delta Hm$}×100

Specifically, the relative crystallinity can be obtained with a DSC apparatus (Diamond DSC, manufactured by Perkin-Elmer), using $\Delta Hcc$, which is an absolute value of a cold crystallization enthalpy of a polylactic acid resin observed in 1st RUN and $\Delta Hm$, which is melt crystallization enthalpy observed in 2nd RUN, wherein 1st RUN includes the steps of heating from 20° to 200° C. at a heating rate of 20° C./minute, holding at 200° C. for 5 minutes, cooling from 200° to 20° C. at a cooling rate of −20° C./minute, holding at 20° C. for 1 minute, and 2nd RUN includes, after 1st RUN, the step of heating from 20° to 200° C. at a heating rate of 20° C./minute.

The time contacting the cooling roller is not necessarily defined because the time differs depending upon the set temperatures of the cooling rollers, the number of cooling rollers, the extrusion rate, and the sheet wind-up speed. For example, the time contacting the cooling roller is preferably from 0.1 to 50 seconds, more preferably from 0.5 to 10 seconds, and even more preferably from 0.8 to 5 seconds, from the viewpoint of efficiently obtaining a sheet in an amorphous state or a semi-crystalline state. The sheet wind-up speed is preferably from 0.1 to 50 m/minute, more preferably from 0.5 to 30 m/minute, and even more preferably from 1 to 20 m/minute.

The sheet surface temperature of the sheet molded article contacting the cooling roller is preferably from 0° to 50° C., more preferably from 0° to 45° C., even more preferably from 0° to 40° C., even more preferably from 0° to 35° C., and even more preferably from 0° to 30° C. In order to improve the contact time and the contact area with the sheet and the cooling roller, plural cooling rollers can be used together, or sheets can be wound around the plural cooling roller surfaces, from the viewpoint of cooling efficiency.

Here, the sheet surface temperature refers to a surface temperature of the sheet immediately after being detached from a cooling roller, and can be measured with a contact-type or non-contact type thermometer.

The winding up with the winding roller is not particularly limited, so long as a sheet in an amorphous state or a semi-crystalline state can be wound from a cooling roller. For example, the winding up of the sheet can be carried out so that a ratio of the sheet to be stretched by rotating a winding roller, which is referred to as a uniaxial stretching ratio at a certain width, simply a stretching ratio, is preferably 12% or less, more preferably 10% or less, even more preferably 7% or less, even more preferably 5% or less, and even more preferably 3% or less. Specifically, the sheet wind-up speed is preferably from 0.1 to 50 m/minute, more preferably from 0.5 to 30 m/minute, and even more preferably from 1 to 20 m/minute. Here, the stretching ratio as used herein is a value calculated by the following formula.

$$\text{Stretching Ratio (\%)} = \frac{\text{Sheet Area After Stretching} - \text{Sheet Area Before Stretching}}{\text{Sheet Area Before Stretching}} \times 100$$

In a case where the sheet for thermoforming of the present invention is molded by press molding, specifically, a sheet for thermoforming of the present invention can be obtained by subjecting a polylactic acid resin composition mentioned above to framed press molding into a frame having a shape of the sheet to prepare a press sheet, and thereafter stretching the press sheet obtained in a state heated to a temperature of equal to or higher than a glass transition temperature with a biaxial stretching machine such as table tenter by means of uniaxial stretching with a certain width at a given ratio.

As the temperature and pressure of the press molding, it is preferable that the press is carried out preferably under the conditions of a temperature of from 170° to 240° C. and a pressure of from 5 to 30 MPa, more preferably under the conditions of a temperature of from 175° to 220° C. and a pressure of from 10 to 25 MPa, and even more preferably under the conditions of a temperature of from 180° to 210° C. and a pressure of from 10 to 20 MPa. The press time cannot be unconditionally determined because the time depends upon the temperature and pressure of the press, and the press time is preferably from 1 to 10 minutes, more preferably from 1 to 7 minutes, and even more preferably from 1 to 5 minutes.

Also, immediately after the press under the above conditions, it is preferable that the molded product is cooled by subjecting to press preferably under the conditions of a temperature of from 0° to 40° C. and a pressure of from 5 to 30 MPa, more preferably under the conditions of a temperature of from 10° to 30° C. and a pressure of from 10 to 25 MPa, and even more preferably under the conditions of a temperature of from 10° to 20° C. and a pressure of from 10 to 20 MPa. By the press under the above temperature conditions, a polyester resin composition in the present invention is cooled to a temperature of lower than its Tg, whereby an amorphous state or a semi-crystalline state can be maintained. The press time cannot be unconditionally determined because the press time depends upon the press temperature and pressure, and the press time is preferably from 1 to 10 minutes, more preferably from 1 to 7 minutes, and even more preferably from 1 to 5 minutes.

The set temperature when subjected to uniaxial stretching at a certain width with a biaxial stretching machine cannot be unconditionally determined because the temperature at which the component mixture can be stretched differs depending upon the contents of the compounds represented by the formulas (1) to (4), and other additives. It is preferable that the sheet temperature is equal to or higher than a glass transition temperature Tg and equal to or lower than a cold crystallization temperature Tc of the melt-kneaded composition obtained, which is a polylactic acid resin composition. Therefore, specific set temperatures are preferably from 30° to 70° C., more preferably from 30° to 65° C., and even more preferably from 35° to 65° C.

It is preferable that the stretching is carried out so that the ratio of the sheet subjected to uniaxial stretching at a certain width with a biaxial stretching machine, which is referred to as a uniaxial stretching ratio at a certain width, simply a stretching ratio, is preferably 12% or less, more preferably 10% or less, even more preferably 7% or less, even more preferably 5% or less, and even more preferably 3% or less. Specifically, the stretching speed is preferably from 1 to 20 mm/s, more preferably from 1 to 10 mm/s, and even more preferably from 2 to 8 mm/s.

Among them, as the preferred method for molding a sheet for thermoforming, extrusion molding is preferred, from the viewpoint of moldability and productivity.

Thus, the sheet for thermoforming of the present invention is obtained. In the sheet for thermoforming of the present invention, by carrying out extrusion molding or press molding, a phase difference Re (cal) calculated by the formula (A) defined above is adjusted within the range of $0.001 \times 10^{-3} \leq$ Re (cal) $\leq 1 \times 10^{-3}$, preferably $0.02 \times 10^{-3} \leq$ Re (cal) $\leq 1.0 \times 10^{-3}$, more preferably $0.03 \times 10^{-3} \leq$ Re (cal) $\leq 0.8 \times 10^{-3}$, even more preferably $0.03 \times 10^{-3} \leq$ Re (cal) $\leq 0.50 \times 10^{-3}$, even more preferably $0.03 \times 10^{-3} \leq$ Re (cal) $\leq 0.30 \times 10^{-3}$, even more preferably $0.03 \times 10^{-3} \leq$ Re (cal) $\leq 0.15 \times 10^{-3}$, and even more preferably $0.03 \times 10^{-3} \leq$ Re (cal) $\leq 0.10 \times 10^{-3}$. Since the variances in orientation are small, it is made possible to mold and process the sheet in a wide molding temperature region at which a sheet may be subjected to secondary processing such as thermoforming. Here, a sheet that does not have Re (cal) falling within the range defined above may be further processed by stretching, press molding or the like to adjust Re (cal).

In addition, the present invention provides a method for producing a sheet for thermoforming of the present invention. Specifically, the method is not particularly limited, so long as the method includes a step of preparing a sheet for thermoforming of the present invention mentioned above, and the method includes, in addition to a production method including winding up with a winding roller, a method including cooling a sheet with a cooling roller, and thereafter producing the sheets in an overlaid state while cutting to a particular length, or a continuous molding method including feeding a thermoforming sheet directly to a thermoforming machine without forming into a roll-like form. Among them, generally, a production method including forming into a roll-like form in "the winding up step" is carried out, from the viewpoint of productivity, storage of sheet, and consequent transport. In addition, as a method for cooling, in addition to a method including bringing a sheet into contact with a cooling roller, a contact with a metal plate for cooling, blowing of cooled air (air knife), a water tank for cooling or the like can be used. In addition, for example, a contact with a metal roller for temperature-control, a contact with a metal plate for temperature-control, blowing temperature-controlled air (air knife), a temperature-controlled tank with infrared rays or a heated wire heater, or the like can also be used.

Specifically, for example, the method includes an "extruding-cooling step" in which a melt-kneaded product is extruded with a T die in an extruder, and thereafter a sheet extruded from the T die is cooled with a cooling roller, and a "winding up step" in which the sheet is wound up into a roll-like form at a certain tension or a certain wind-up speed. The surface temperature of the sheet may increase in the winding up step depending upon the environments of the production sites and the timing of the production, and when a sheet is wound up into a roll-like shape in a state that a sheet surface temperature is high, the sheet may cause to stretch in an extrusion direction in a slight amount. The sheet thus obtained has a greater phase difference of the sheets because of the stretching in a slight amount, which may cause disadvantageous influences to the subsequent thermoforming property, a moldable temperature region. Accordingly, it is important to control the sheet surface temperature low (cool) in order to inhibit an excessive temperature rise in the winding up step. In other words, according to the present invention, in order to control the phase difference within a particular range, by adjusting a sheet surface temperature in the winding up step to 0° to 50° C., it is made possible to produce an excellent sheet for thermoforming. Here, the conditions for melt-kneading, the conditions for cooling, and the conditions for winding up are as described above.

Preferred embodiments of the method for producing a sheet for thermoforming of the present invention include the followings. In the embodiments, the step (I) and the step (II) correspond to the extruding-cooling step mentioned above, and the step (III) corresponds to a winding up step.

A method for producing a sheet for thermoforming, including the following steps (I) to (III):

step (I): extruding a polylactic acid resin composition from an extruder at a temperature of from 170° to 240° C. to prepare a sheet molded article;

step (II): providing the sheet molded article obtained in the step (I) into contact with a cooling roller at a temperature of lower than 40° C., to cool the sheet molded article to a sheet surface temperature of from 0° to 50° C.; and step (III): winding up the sheet molded article from the cooling roller in the step (II) under the condition that a stretching ratio is 12% or less, wherein the sheet for thermoforming has a thickness of from 0.1 to 1.5 mm, made of the polylactic acid resin composition containing a polylactic acid-based resin, and a plasticizer in an amount of from 1.0 to 20 parts by weight and a crystal nucleating agent in an amount of from 0.01 to 1 part by weight, based on 100 parts by weight of the polylactic acid-based resin.

The thermoformed article of the present invention can be molded in accordance with a known method without particular limitation. For example, a sheet for thermoforming in an amorphous state or a semi-crystalline state prepared by the above-mentioned method is thermoformed within a temperature range of equal to or higher than a glass transition temperature Tg and lower than a melting point Tm of the polylactic acid resin composition, to thereby allow crystallization, whereby a crystallized thermoformed article having a relative crystallinity, as obtained by the method mentioned above, of preferably 80% or more, and more preferably 90% or more can be obtained.

The thermoformed article according to the present invention includes, for example, molded articles obtained by vacuum molding or pressure molding. These can be molded in accordance with known methods without particular limitation, and the molded article is obtained, for example, by setting a sheet for thermoforming in an amorphous state or a semi-crystalline state of the present invention in a mold in a vacuum pressure molding machine, heating the sheet inside the mold to a temperature equal to or higher than a glass transition temperature Tg and lower than a melting point Tm of the polylactic acid resin composition, and holding the sheet in a pressed or non-pressed state, to allow forming.

The mold temperature may be a temperature equal to or higher than a glass transition temperature Tg of the polylactic acid resin composition and lower than a melting point Tm thereof, from the viewpoint of improving crystallization velocity of the polylactic resin composition and improving operability. Specifically, the mold temperature is preferably 120° C. or lower, more preferably 115° C. or lower, and even more preferably 110° C. or lower. In addition, the mold temperature may be a temperature so that the surface temperature of a sheet for thermoforming of the present invention would be 60° C. or higher, preferably 70° C. or higher, more preferably 75° C. or higher, and even more preferably 80° C. or higher. From the above viewpoint, the mold temperature is preferably from 70° to 120° C., more preferably from 75° to 115° C., and even more preferably from 80° to 110° C.

For example, the holding time inside the mold is preferably from 2 to 60 seconds, more preferably from 3 to 30 seconds, and even more preferably from 5 to 20 seconds in a mold at 90° C., and the holding time inside the mold is preferably from 2 to 60 seconds, more preferably from 3 to 30 seconds, more preferably from 5 to 20 seconds, and even more preferably from 5 to 15 seconds in a mold at 100° C., from the viewpoint of improving heat resistance and productivity of the thermoformed article made of the polylactic acid resin composition. Since the polylactic acid resin composition according to the present invention has a high crystallization velocity, a molded article having sufficient heat resistance is obtained with a short holding time as mentioned above.

The thickness of a thermoformed article of the present invention thus obtained is, but not particularly limited to, preferably from 0.1 to 1.5 mm, more preferably from 0.15 to 1.4 mm, and even more preferably from 0.2 to 1.2 mm, from the viewpoint of obtaining evenness in a molded article, which is a secondary processed product.

The thermoformed article of the present invention has excellent fittability because the sheet for thermoforming of the present invention has excellent thermoforming property. In addition, since the thermoformed article has excellent plasticization effect owing to the compound represented by the formula (1), the compound represented by the formula (4), or the compound represented by the formula (6), the molded article obtained is highly crystalline, and has excellent heat resistance and transparency.

Since the thermoformed article of the present invention has excellent transparency, the Haze value (%) is preferably 75% or less, more preferably 50% or less, even more preferably 30% or less, even more preferably 10% or less, even more preferably 6% or less, even more preferably 5.0% or less, even more preferably 4.5% or less, and even more preferably 4.0% or less. Accordingly, the thermoformed article of the present invention is also referred to as a transparent molded article. Here, in the present specification, the Haze value is an index for transparency, which can be measured in accordance with the method described in Examples set forth below.

The method of secondary processing of a sheet for thermoforming of the present invention is not particularly limited, so long as the method is a method including molding the sheet to prepare a molded article mentioned above, and the method is as mentioned above.

The thermoformed article thus obtained has a relative crystallinity as high as of preferably 80% or more, and more preferably 90% or more, and has excellent transparency, and excellent heat resistance, bleeding resistance, and strength, so that the thermoformed articles can be suitably used in various applications, especially blister packs or trays for packaging materials for daily sundries, cosmetics, household electric appliances and the like; food containers such as lids for lunch-boxes; or industrial trays used in transportation or protection of industrial parts.

With respect to the embodiments described above, the present invention further discloses the following polylactic acid resin composition, the production method, the molded article, and use.

<1> A sheet for thermoforming made of a polylactic acid resin composition containing a polylactic acid-based resin, a plasticizer, and a crystal nucleating agent, wherein the sheet has a thickness of from 0.1 to 1.5 mm, and wherein Re (cal) calculated by the following formula (A):

$$Re(cal) = Re(obs)/d \times 10^{-6} \tag{A}$$

wherein Re (obs) is a phase difference (nm) measured at a wavelength selected from wavelengths of from 380 to 780 nm, and d is a thickness (mm) of the sheet, is within the range of $0.001 \times 10^{-3} \leq Re$ (cal)$\leq 1 \times 10^{-3}$, preferably $0.02 \times 10^{-3} \leq Re$ (cal)$\leq 1.0 \times 10^{-3}$, more preferably $0.03 \times 10^{-3} \leq Re$ (cal)$\leq 0.8 \times 10^{-3}$, even more preferably $0.03 \times 10^{-3} \leq Re$ (cal)$\leq 0.50 \times 10^{-3}$, even more preferably $0.03 \times 10^{-3} \leq Re$ (cal)$\leq 0.30 \times 10^{-3}$, even more preferably $0.03 \times 10^{-3} \leq Re$ (cal)$\leq 0.15 \times 10^{-3}$, and even more preferably $0.03 \times 10^{-3} \leq Re$ (cal)$\leq 0.10 \times 10^{-3}$.

<2> The sheet for thermoforming according to the above <1>, wherein the polylactic acid resin composition further contains a nonionic surfactant.

<3> The sheet for thermoforming according to the above <1> or <2>, wherein the plasticizer contains a compound represented by the formula (1):

$$R^1—O(A^1O)_m—CORCOO-(A^1O)_n—R^2 \tag{1}$$

wherein $R^1$ and $R^2$ are an alkyl group having from 1 to 4 carbon atoms or a benzyl group, wherein $R^1$ and $R^2$ may be identical or different; R is an alkylene group having from 1 to 4 carbon atoms; $A^1$ is an alkylene group having 2 or 3 carbon atoms, wherein m or n number of $A^1$'s may be identical or different; and each of m and n is the number showing an average number of moles of oxyalkylene groups added that satisfies $0 \leq m \leq 5$, $0 \leq n \leq 5$, and $1 \leq m+n \leq 8$.

<4> The sheet for thermoforming according to the above <1> or <2>, wherein the plasticizer contains a compound represented by the formula (4):

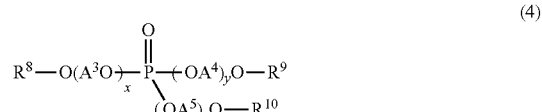

wherein each of $R^8$, $R^9$, and $R^{10}$ is independently an alkyl group having from 1 to 4 carbon atoms; each of $A^3$, $A^4$, and $A^5$ is independently an alkylene group having 2 or 3 carbon atoms; each of x, y, and z is independently a positive number showing the number of average moles of an oxyalkylene group added, wherein x+y+z is the number satisfying exceeding 3 and 12 or less.

<5> The sheet for thermoforming according to any one of the above <1> to <4>, wherein the content of the plasticizer is preferably 1 part by weight or more, and preferably 40 parts by weight or less, more preferably 30 parts by weight or less, even more preferably 20 parts by weight or less, even more preferably 10 parts by weight or less, even more preferably 7 parts by weight or less, and even more preferably 5 parts by weight or less, based on 100 parts by weight of the polylactic acid-based resin.

<6> The sheet for thermoforming according to any one of the above <1> to <5>, wherein the crystal nucleating agent contains a compound represented by the formula (2):

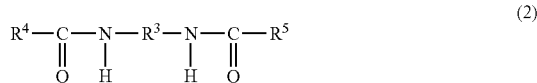

wherein $R^3$ is an alkylene group having from 1 to 10 carbon atoms; and $R^4$ and $R^5$ are a linear or branched alkyl group having from 5 to 21 carbon atoms, which may have a substituent, wherein $R^4$ and $R^5$ may be identical or different.

<7> The sheet for thermoforming according to any one of the above <1> to <6>, wherein the content of the crystal nucleating agent is preferably 0.01 parts by weight or more, and more preferably 0.1 parts by weight or more, and preferably 3 parts by weight or less, more preferably 2 parts by weight or less, even more preferably 1 part by weight or less, even more preferably 0.7 parts by weight or less, and even more preferably 0.5 parts by weight or less, based on 100 parts by weight of the polylactic acid-based resin.

<8> The sheet for thermoforming according to any one of the above <2> to <7>, wherein the nonionic surfactant contains a compound represented by the formula (3):

wherein $R^6$ is an alkyl group having from 8 to 22 carbon atoms, an acyl group having from 8 to 22 carbon atoms in total, or a hydrogen atom; $R^7$ is a hydrogen atom, an alkyl group having from 1 to 4 carbon atoms, or an acyl group having from 2 to 4 carbon atoms in total; $A^2$ is an alkylene group having 2 or 3 carbon atoms; p is the number of average moles of an oxyalkylene group added, wherein p is the number satisfying 0≤p≤300, and wherein p number of oxyalkylene groups represented by ($A^2$O) may be identical or different, and the repeating units, when different, may be either in a block form or a random form.

<9> The sheet for thermoforming according to any one of the above <2> to <8>, wherein the content of the nonionic surfactant is preferably 0.1 parts by weight or more, and more preferably 0.5 parts by weight or more, and preferably 10 parts by weight or less, more preferably 5 parts by weight or less, even more preferably 3 parts by weight or less, and even more preferably 2.5 parts by weight or less, based on 100 parts by weight of the polylactic acid-based resin.

<10> The sheet for thermoforming according to any one of the above <1> to <9>, wherein the relative crystallinity of the polylactic acid resin composition is less than 80%.

<11> The sheet for thermoforming according to any one of the above <1> to <10>, wherein the thickness is from 0.1 to 1.5 mm, preferably 0.15 mm or more, and more preferably 0.2 mm or more, and preferably 1.2 mm or less, more preferably 1.0 mm or less, even more preferably 0.7 mm or less, even more preferably 0.4 mm or less, and even more preferably 0.3 mm or less.

<12> A method for producing a sheet for thermoforming, including the following steps (I) to (III):

step (I): extruding a polylactic acid resin composition from an extruder at a temperature of from 170° to 240° C. to prepare a sheet molded article;

step (II): providing the sheet molded article obtained in the step (I) into contact with a cooling roller at a temperature of lower than 40° C., to cool the sheet molded article to a sheet surface temperature of from 0° to 50° C.; and step (III): winding up the sheet molded article from the cooling roller in the step (II) under the condition that a stretching ratio is 12% or less, wherein the sheet for thermoforming has a thickness of from 0.1 to 1.5 mm, made of the polylactic acid resin composition containing a polylactic acid-based resin, and a plasticizer in an amount of from 1 to 20 parts by weight and a crystal nucleating agent in an amount of from 0.01 to 1 part by weight, based on 100 parts by weight of the polylactic acid-based resin.

<13> The method according to the above <12>, wherein the polylactic acid resin composition further contains a nonionic surfactant in an amount of preferably 0.1 parts by weight or more, and more preferably 0.5 parts by weight or more, and preferably 10 parts by weight or less, more preferably 5 parts by weight or less, even more preferably 3 parts by weight or less, and even more preferably 2.5 parts by weight or less, based on 100 parts by weight of the polylactic acid-based resin.

<14> The method according to the above <12> or <13>, wherein the plasticizer is an aliphatic ester.

<15> The method according to any one of the above <12> to <14>, wherein the plasticizer contains a compound represented by the formula (1):

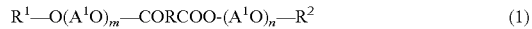

wherein $R^1$ and $R^2$ are an alkyl group having from 1 to 4 carbon atoms or a benzyl group, wherein $R^1$ and $R^2$ may be identical or different; R is an alkylene group having from 1 to 4 carbon atoms; $A^1$ is an alkylene group having 2 or 3 carbon atoms, wherein m or n number of $A^1$'s may be identical or different; and each of m and n is the number showing an average number of moles of oxyalkylene groups added that satisfies 0≤m≤5, 0≤n≤5, and 1≤m+n≤8.

<16> The method according to any one of the above <12> to <15>, wherein the plasticizer contains a compound represented by the formula (4):

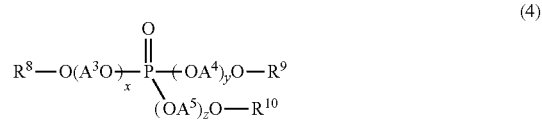

wherein each of $R^8$, $R^9$, and $R^{10}$ is independently an alkyl group having from 1 to 4 carbon atoms; each of $A^3$, $A^4$, and $A^5$ is independently an alkylene group having 2 or 3 carbon atoms; each of x, y, and z is independently a positive number showing the number of average moles of an oxyalkylene group added, wherein x+y+z is the number satisfying exceeding 3 and 12 or less.

<17> The method according to any one of the above <12> to <16>, wherein the crystal nucleating agent is an aliphatic carboxylic acid amide.

<18> The method according to any one of the above <12> to <17>, wherein the crystal nucleating agent contains a compound represented by the formula (2):

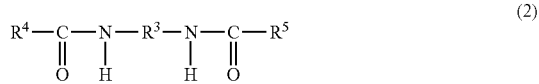

wherein $R^3$ is an alkylene group having from 1 to 10 carbon atoms; and $R^4$ and $R^5$ are a linear or branched alkyl group having from 5 to 21 carbon atoms, which may have a substituent, wherein $R^4$ and $R^5$ may be identical or different.

<19> The method according to any one of the above <13> to <18>, wherein the nonionic surfactant contains a compound represented by the formula (3):

wherein $R^6$ is an alkyl group having from 8 to 22 carbon atoms, an acyl group having from 8 to 22 carbon atoms in total, or a hydrogen atom; $R^7$ is a hydrogen atom, an alkyl group having from 1 to 4 carbon atoms, or an acyl group having from 2 to 4 carbon atoms in total; $A^2$ is an alkylene group having 2 or 3 carbon atoms; p is the number of average moles of an oxyalkylene group added, wherein p is the number satisfying 0≤p≤300, and wherein p number of oxyalkylene groups represented by ($A^2O$) may be identical or different, and the repeating units, when different, may be either in a block form or a random form.

<20> The method according to any one of the above <12> to <19>, wherein the wind-up speed in the step (III) is preferably from 0.1 to 50 m/minute, more preferably from 0.5 to 30 m/minute, and even more preferably from 1 to 20 m/minute.

<21> The method according to any one of the above <12> to <20>, wherein the time during which the sheet contacts a cooling roller in the step (II) is preferably from 0.1 to 50 seconds, more preferably from 0.5 to 10 seconds, and even more preferably from 0.8 to 5 seconds.

<22> The method according to any one of the above <12> to <21>, wherein the sheet for thermoforming obtained has a relative crystallinity of less than 80%.

<23> The method according to any one of the above <12> to <22>, wherein the sheet for thermoforming obtained has Re (cal) calculated by the following formula (A):

$$Re(cal)=Re(obs)/d \times 10^{-6} \quad (A)$$

wherein Re (obs) is a phase difference (nm) measured at a wavelength selected from wavelengths of from 380 to 780 nm, and d is a thickness (mm) of the sheet, within the range of $0.001 \times 10^{-3} \leq Re(cal) \leq 1 \times 10^{-3}$, preferably $0.02 \times 10^{-3} \leq Re(cal) \leq 1.0 \times 10^{-3}$, more preferably $0.03 \times 10^{-3} \leq Re(cal) \leq 0.8 \times 10^{-3}$, even more preferably $0.03 \times 10^{-3} \leq Re(cal) \leq 0.50 \times 10^{-3}$, even more preferably $0.03 \times 10^{-3} \leq Re(cal) \leq 0.30 \times 10^{-3}$, even more preferably $0.03 \times 10^{-3} \leq Re(cal) \leq 0.15 \times 10^{-3}$, and even more preferably $0.03 \times 10^{-3} \leq Re(cal) \leq 0.10 \times 10^{-3}$.

<24> A transparent molded article made of a polylactic acid resin composition, the transparent molded article having a relative crystallinity of preferably 80% or more, and more preferably 90% or more, produced by subjecting a sheet for thermoforming as defined in any one of the above <1> to <11> to vacuum molding or pressure molding.

<25> A packaging material made of a transparent molded article as defined in the above <24>.

<26> A method for secondary processing of a sheet, characterized by subjecting a sheet for thermoforming as defined in any one of the above <1> to <11> to vacuum molding or pressure molding.

<27> Use of a sheet for thermoforming as defined in any one of the above <1> to <11> as a thermoformed article.

<28> Use of a sheet for thermoforming as defined in any one of the above <1> to <11> as a packaging material.

<29> Use of a sheet for thermoforming as defined in any one of the above <1> to <11> as a food container.

EXAMPLES

The present invention will be explained more specifically hereinbelow by showing Examples and Comparative Examples, without intending to limit the present invention to the Examples set forth below.

[Phase Difference Re (Obs) of Sheet]

Each of the phase differences of the sheet for thermoforming is measured with a phase difference measurement instrument "KOBRA-WPR," manufactured by Oji Scientific Instruments, under the conditions mentioned below.

<Measurement Conditions>

Wavelength: 590 nm

Size of Measured Sheet: 3 cm×3 cm

[Thickness d of Sheet]

The thickness of the sheet for thermoforming is measured with Digimatic Micrometer "MDC-25MJ," manufactured by Mitutoyo.

Production Example 1 of Plasticizer—Carboxylic Acid Ester Represented by Formula (1), $(MeEO_3)_2SA$ A 3-L flask equipped with a stirrer, a thermometer, and a dehydration tube was charged with 500 g (5.0 mol) of succinic anhydride, 2,463 g (15.0 mol) of triethylene glycol monomethyl ether, and 9.5 g of paratoluenesulfonic acid monohydrate, and the contents were allowed to react at 110° C. for 15 hours under a reduced pressure of from 4 to 10.7 kPa, while blowing nitrogen at 500 mL/min in a space portion. The liquid reaction mixture had an acid value of 1.6 mgKOH/g. To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and after cooling to 80° C., the residue was filtered under a reduced pressure, to provide a diester formed between succinic acid and triethylene glycol monomethyl ether, $(MeEO_3)_2SA$, as a filtrate. The diester obtained had a weight-average molecular weight of 410, a viscosity at 23° C. of 27 mPa·s, an acid value of 0.2 KOHmg/g, a saponification value of 274 KOHmg/g, a hydroxyl value of 1 KOHmg/g or less, and a hue APHA of 200.

Production Example 2 of Plasticizer—Tris(ethoxyethoxyethyl)Phosphate, TEP-2

A 1-liter four-neck flask was charged with 600 g (4.47 mol) of diethylene glycol monoethyl ether, and the content was stirred under a reduced pressure of 20 kPa and 15° C., while blowing a dry nitrogen gas at a flow rate of 50 mL per minute. Next, 114 g (0.745 mol) of phosphorus oxychloride was slowly added dropwise while keeping the internal of the reaction system at 15° C., and the mixture was then aged at 40° to 60° C. for 5 hours. Thereafter, 149 g of a 16% by weight aqueous sodium hydroxide solution was added thereto to neutralize, and an excess unreacted diethylene glycol monoethyl ether was distilled off in vacuo under the temperature conditions of from 70° to 120° C. Further, the residue was contacted with steam, to provide 367 g of a crude phosphoric triester. Further, to this crude phosphoric triester was added 300 g of a 16% by weight aqueous sodium chloride solution to wash the crude phosphoric triester. Thereafter, a lower layer of the separated layers was discarded, and the remaining upper layer was dehydrated at 75° C. under a reduced pressure, and thereafter further filtered to remove a solid content, to provide 266 g of an intended tris(ethoxyethoxyethyl)phosphate, TEP-2 (yield: 80%). This tris(ethoxyethoxyethyl)phosphate was a colorless, transparent homogeneous liquid, and was subjected to chlorine ion analysis. As a result of chlorine ion analysis, the tris(ethoxyethoxyethyl)phosphate had a chlorine ion content of 10 mg/kg or less.

Examples 1 to 34 and Comparative Examples 1 to 4

Preparation of Polylactic Acid Resin Composition

As a polyester resin composition, raw materials for compositions as listed in any of Tables 1 to 7 were melt-kneaded with a twin-screw extruder manufactured by Ikegai Corporation, PCM-45 at a rotational speed of 100 r/min and a melt-kneading temperature of 190° C., and the kneaded mixture was strand-cut, to provide pellets of a polylactic acid resin composition. The pellets obtained were dried at 70° C. under a reduced pressure for an entire day, so as to have a water content of 500 ppm or less.

Preparation of Sheet for Thermoforming (Examples 1 to 19 and Comparative Examples 1 to 3)

Between two stainless steel plates "Ferro-type Plate Deluxe," manufactured by ASANUMA & CO. LTD. with hard chromium plating finishing, the stainless steel plates having a thickness of 0.5 mm were filled a square spacer frame of 20 cm each side and having a width of 2 cm, and the above-mentioned kneaded pellets in an inner side thereof, and as pre-heating for melting the pellets, the pellets were pressed for 2 minutes at a press temperature of 185° C. and a press pressure of 0.4 MPa, and then pressed for additional 2 minutes at a pressure of 20 MPa. Thereafter, the pressed pellets were immediately cooled with press plates set at 15° C. and 0.4 MPa for 1 minutes, to give an amorphous sheet having a certain thickness.

Next, the resulting amorphous sheet having dimensions of 20 cm×20 cm was subjected to a uniaxial stretching at a certain width to an areal stretching ratio as listed in any of Tables 1 to 5 at a stretching temperature, a set temperature, as listed in any of Tables 1 to 5 with a table tenter testing machine manufactured by Iwamoto Seisakusho, under the conditions of a preheat time of 45 seconds, a stretching speed of 5 mm/s, a holding time of 3 minutes, to prepare a sheet for thermoforming having a thickness of 0.25 mm.

Preparation of Sheet for Thermoforming (Examples 20 to 34 and Comparative Example 4)

The sheet molding having a width of 40 cm was carried out with an extrusion sheet molding machine equipped with a cooling roller and a heating roller "Single-Layered Sheet Molding Machine, Model: BNT-32," manufactured by PLABOR Research Laboratories of Plastics Technology Co., Ltd., under the following extrusion molding conditions.

During the sheet molding, the sheet was brought into contact with a cooling roller so that the sheet surface temperature during winding would be a temperature as listed in Table 6 by adjusting a wind-up speed and a cooling roller temperature, and thereafter a wind-up speed was adjusted so as to have a stretching ratio, a uniaxial stretching ratio at a certain width, as listed in Table 6, to prepare a sheet for thermoforming. Here, the cylinder temperature and the die (outlet) temperature of the twin-screw kneaded portion were observed with a contact-type thermometer.

<Extrusion Molding Conditions>

Cylinder Temperature of Twin-Screw Kneaded Portion: 200° C. (found value)
Die (Outlet) Temperature: 190° C. (found value)
Wind-up Speed (Drawing Speed): 2, 5, 10, 20, 30, or 50 m per minute
Cooling Roller Temperature: 20°, 30°, and 40° C.

Preparation of Thermoformed Article and Evaluation

Next, with a single-step vacuum pressure forming machine "FVS-500P WAKITEC," manufactured by WAKISAKA Co., Ltd., the above-mentioned sheet for thermoforming was placed along the guide, and the sheet was heated while varying a holding time in a heater section, a preheating time, as listed in any of Tables 1 to 7, in which a heater temperature was set at 400° C. until the temperature of the sheet surface became a temperature as listed in any of Tables 1 to 7. The sheet heated at each temperature was subjected to vacuum forming with upper and lower molds set at 100° C., and the sheet was held in a mold for 10 seconds and then demolded, to provide a thermoformed article. As to the temperature of the sheet surface, a surface temperature of the heated sheet was directly measured with a surface thermometer. Here, the mold used, a lid, is shown in FIG. 1.

<Fittability>

The molded article obtained above was fitted to a body part having φ 81 mm, a height of 51 mm, and the material being made of PP-containing low-foamable PS, of a commercially available vessel under the trade name of SHINO Yunomi 90, manufactured by C P CHEMICAL INCORPORATED. A case where the molded article could be easily fitted was ranked "A"; and a case where the molded article could not fit were ranked "B." The results are shown in Tables 1 to 7.

<Crystallinity>

In addition, the thermoformed articles and the sheets for thermoforming were evaluated for their crystallinity. Specifically, 7.5 mg of each of the thermoformed articles and the sheets for thermoforming was accurately weighed, and encapsulated in an aluminum pan. Thereafter, using a DSC apparatus (Diamond DSC, manufactured by PerkinElmer), the 1st RUN included heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN included heating from 20° to 200° C. at a heating rate of 20° C./minute. ΔHcc, an absolute value of a cold crystallization enthalpy of a polylactic acid resin observed in 1st RUN, and ΔHm, a melt crystallization enthalpy observed in 2nd RUN, were obtained, and from the found values a relative crystallinity (%) was calculated by the following formula:

$$\text{Relative Crystallinity (\%)} = \{(\Delta Hm - \Delta Hcc)/\Delta Hm\} \times 100$$

The results are shown in Tables 1 to 7.
<Transparency>
Parts of the formed article that could be easily fitted in the evaluation of Fittability mentioned above were cut out, and Haze values, %, were measured with a haze meter, Model HM-150, manufactured by MURAKAMI COLOR RESEARCH LABORATORY CO., Ltd., and used as indexes for transparency. The smaller the values of Haze value, the more excellent the transparency. The results are shown in Tables 1 to 7.

Here, the raw materials in Tables 1 to 7 are as follows.
<Polylactic Acid Resin>
NW4032D: Polylactic acid resin, manufactured by Nature Works LLC, Nature Works 4032D
<Plasticizer>
(MeEO$_3$)$_2$SA: a diester compound obtained from succinic acid and triethylene glycol monomethyl ether produced in Production Example 1 of Plasticizer mentioned above, average molecular weight: 410, a compound in the formula (1) where $R^1$ and $R^2$ are methyl groups, R is an ethylene group, $A^1$ is an ethylene group, m=3, and n=3
TEP-2: tris(ethoxyethoxyethyl)phosphate produced in Production Example 2 of Plasticizer mentioned above, average molecular weight: 447, a compound represented by the formula (4)
DAIFATTY-101: a diester formed between adipic acid and a 1/1 mixture of diethylene glycol monomethyl ether/benzyl alcohol, manufactured by DAIHACHI CHEMICAL INDUSTRY CO., LTD., average molecular weight: 338, a compound in the formula (1) where $R^1$ is a methyl group, $R^2$ is a benzyl group, R is a tetramethylene group, $A^1$ is an ethylene group, m=2, and n=0
<Crystal Nucleating Agent>
SLIPACKS H: ethylenebis 12-hydroxystearamide, manufactured by Nippon Kasei Chemical Co., Ltd., a compound in the formula (2) where $R^4$ and $R^5$ are a 11-hydroxyheptadecyl group, and $R^3$ is an ethylene group SLIPACKS 0: ethylenebis oleamide, manufactured by Nippon Kasei Chemical Co., Ltd., a compound in the formula (2) where $R^4$ and $R^5$ are a heptadecenyl group, and $R^3$ is an ethylene group
<Nonionic Surfactant>
ADEKA Pluronic 25R-2: a polyoxyethylene-polypropylene copolymer, manufactured by ADEKA, average molecular weight: 3,500, a compound in the formula (3) where $R^6$ and $R^7$ are a hydrogen atom, $(A^2O)_p$ is a block form of polyoxypropylene-polyoxyethylene-polyoxypropylene, wherein the number of p' of the polyoxypropylene groups is 47, the number of p' of the polyoxyethylene groups is 16, and a total of the number of p in the formula (3) is 63
EMANON 4110: a monoester obtained from oleic acid and polyoxyethylene glycol, manufactured by Kao Corporation, average molecular weight: 680, a compound in the formula (3) where $R^6$ is an unsaturated acyl group derived from oleic acid, $R^7$ is a hydrogen atom, $A^2$ is an ethylene group, and p is 9
<Hydrolysis Inhibitor>
Carbodilite LA-1: Polycarbodiimide, manufactured by Nisshinbo Chemical Inc.

TABLE 1

|  |  |  | Examples | | | | | |
|---|---|---|---|---|---|---|---|---|
|  |  |  | 1 | 2 | 3 | 4 | 5 | 6 |
| Components | Polylactic Acid Resin | NW4032D | 100 | 100 | 100 | 100 | 100 | 100 |
|  | Plasticizer | Me(EO$_3$)$_2$SA | 10 | 4 | 4 | 4 | 4 | 4 |
|  | Crystal Nucleating Agent | SLIPACKS H | 0.3 | 0.3 | 0.3 | 0.3 | 0.3 | 0.3 |
|  | Nonionic Surfactant | ADEKA Pluronic 25R-2 | 0 | 1 | 1 | 1 | 1 | 1 |
|  | Hydrolysis Inhibitor | Carbodilite LA-1 | 0.2 | 0.2 | 0.2 | 0.2 | 0.2 | 0.2 |
| Stretching Conditions with Table Tenter | Set Temperature, ° C. | | 50 to 55 | 55 to 60 | 55 to 60 | 55 to 60 | 55 to 60 | 55 to 60 |
|  | Stretching Speed, mm/s | | 5 | 5 | 5 | 5 | 5 | 5 |
|  | Stretching Ratio, % | | 1 | 3 | 5 | 7 | 10 | 12 |
| Sheet for Thermoforming | Re (obs), nm | | 33 | 15 | 65 | 81 | 137 | 164 |
|  | Thickness, mm | | 0.25 | 0.25 | 0.25 | 0.25 | 0.25 | 0.40 |
|  | Re (cal) | | 0.13 × 10$^{-3}$ | 0.06 × 10$^{-3}$ | 0.26 × 10$^{-3}$ | 0.32 × 10$^{-3}$ | 0.55 × 10$^{-3}$ | 0.41 × 10$^{-3}$ |
|  | Relative Crystallinity, % | | 50 | 49 | 52 | 54 | 55 | 56 |
| Evaluation, Fittability | Heating Time, sec | Sheet Surface Temp., ° C. | | | | | | |
|  | 3.0 | 55 | B | B | B | B | B | B |
|  | 3.5 | 61 | B | A | B | B | B | B |
|  | 4.0 | 67 | A | A | A | B | B | B |
|  | 4.5 | 73 | A | A | A | A | A | B |
|  | 5.0 | 79 | B | A | A | A | B | B |
|  | 5.5 | 84 | B | A | A | A | B | B |
|  | 6.0 | 88 | B | A | B | B | B | B |
|  | 6.5 | 93 | B | B | B | B | B | B |
|  | 7.0 | 98 | B | B | B | B | B | A |
|  | 7.5 | 103 | B | B | B | B | B | A |
|  | 8.0 | 108 | B | B | B | B | B | A |
|  | 8.5 | 113 | B | B | B | B | B | B |

TABLE 1-continued

|  |  | Examples | | | | | |
|---|---|---|---|---|---|---|---|
|  |  | 1 | 2 | 3 | 4 | 5 | 6 |
| Evaluation, Crystallinity | Relative Crystallinity, % | 100 | 100 | 100 | 100 | 100 | 100 |
| Evaluation, Transparency | Haze, % | 4.9 | 4.0 | 4.3 | 4.3 | 4.8 | 5.3 |

The amounts of the raw materials are expressed by parts by weight.

TABLE 2

|  |  |  | Comparative Examples | | |
|---|---|---|---|---|---|
|  |  |  | 1 | 2 | 3 |
| Components | Polylactic Acid Resin | NW4032D | 100 | 100 | 100 |
|  | Plasticizer | Me(EO$_3$)$_2$SA | 10 | 4 | 4 |
|  | Crystal Nucleating Agent | SLIPACKS H | 0.3 | 0.3 | 0.3 |
|  | Nonionic Surfactant | ADEKA Pluronic 25R-2 | 0 | 1 | 1 |
|  | Hydrolysis Inhibitor | Carbodilite LA-1 | 0.5 | 0.2 | 0.2 |
| Stretching Conditions with Table Tenter Sheet for Thermoforming | Set Temperature, °C. | | 45 to 50 | 55 to 60 | 55 to 60 |
|  | Stretching Speed, mm/s | | 5 | 5 | 5 |
|  | Stretching Ratio, % | | 20 | 20 | 30 |
|  | Re (obs), nm | | 320 | 275 | 480 |
|  | Thickness, mm | | 0.25 | 0.25 | 0.40 |
|  | Re (cal) | | $1.28 \times 10^{-3}$ | $1.10 \times 10^{-3}$ | $1.20 \times 10^{-3}$ |
|  | Relative Crystallinity, % | | 62 | 57 | 57 |

|  | Heating Time, sec | Sheet Surface Temp., °C. |  |  |  |
|---|---|---|---|---|---|
| Evaluation, Fittability | 3.0 | 55 | B | B | B |
|  | 3.5 | 61 | B | B | B |
|  | 4.0 | 67 | B | B | B |
|  | 4.5 | 73 | B | B | B |
|  | 5.0 | 79 | B | B | B |
|  | 5.5 | 84 | B | B | B |
|  | 6.0 | 88 | B | B | B |
|  | 6.5 | 93 | B | B | B |
|  | 7.0 | 98 | B | B | B |
|  | 7.5 | 103 | B | B | B |
|  | 8.0 | 108 | B | B | B |
|  | 8.5 | 113 | B | B | B |
| Evaluation, Crystallinity | Relative Crystallinity, % | | 100 | 100 | 100 |
| Evaluation, Transparency | Haze, % | | 5.5 | 5.2 | 5.8 |

The amounts of the raw materials are expressed by parts by weight.

TABLE 3

|  |  |  | Examples | | | |
|---|---|---|---|---|---|---|
|  |  |  | 7 | 8 | 9 | 10 |
| Components | Polylactic Acid Resin | NW4032D | 100 | 100 | 100 | 100 |
|  | Plasticizer | Me(EO$_3$)$_2$SA | 6 | 6 | 6 | 6 |
|  | Crystal Nucleating Agent | SLIPACKS H | 0.3 | 0.3 | 0.3 | 0.3 |
|  | Nonionic Surfactant | EMANON 4110 | 1 | 1 | 1 | 1 |
|  | Hydrolysis Inhibitor | Carbodilite LA-1 | 0.5 | 0.5 | 0.5 | 0.5 |

TABLE 3-continued

| | | | Examples | | | |
|---|---|---|---|---|---|---|
| | | | 7 | 8 | 9 | 10 |
| Stretching Conditions with Table Tenter | Set Temperature, °C. | | 50 to 55 | 55 to 60 | 55 to 60 | 55 to 60 |
| | Stretching Speed, mm/s | | 5 | 5 | 5 | 5 |
| | Stretching Ratio, % | | 1 | 5 | 7 | 10 |
| Sheet for Thermoforming | Re (obs), nm | | 10 | 80 | 93 | 132 |
| | Thickness, mm | | 0.25 | 0.25 | 0.25 | 0.25 |
| | Re (cal) | | $0.04 \times 10^{-3}$ | $0.32 \times 10^{-3}$ | $0.37 \times 10^{-3}$ | $0.53 \times 10^{-3}$ |
| | Relative Crystallinity, % | | 48 | 53 | 54 | 56 |
| | Heating Time, sec | Sheet Surface Temp., °C. | | | | |
| Evaluation, Fittability | 3.0 | 55 | B | B | B | B |
| | 3.5 | 61 | B | B | B | B |
| | 4.0 | 67 | B | A | A | A |
| | 4.5 | 73 | A | A | A | B |
| | 5.0 | 79 | A | B | B | B |
| | 5.5 | 84 | A | B | B | B |
| | 6.0 | 88 | A | B | B | B |
| | 6.5 | 93 | A | B | B | B |
| | 7.0 | 98 | A | B | B | B |
| | 7.5 | 103 | B | B | B | B |
| | 8.0 | 108 | not tested | B | B | B |
| | 8.5 | 113 | not tested | B | B | B |
| | 9.0 | 118 | not tested | B | B | B |
| Evaluation, Crystallinity | Relative Crystallinity, % | | 100 | 100 | 100 | 100 |
| Evaluation, Transparency | Haze, % | | 4.9 | 5.1 | 5.3 | 5.5 |

The amounts of the raw materials are expressed by parts by weight.

TABLE 4

| | | | Examples | | | | | |
|---|---|---|---|---|---|---|---|---|
| | | | 11 | 12 | 13 | 14 | 15 | 16 |
| Components | Polylactic Acid Resin | NW4032D | 100 | 100 | 100 | 100 | 100 | 100 |
| | Plasticizer | Me(EO$_3$)$_2$SA | 3 | 3 | 3 | 4 | 4 | 4 |
| | | DAIFATTY-101 | 3 | 3 | 3 | 0 | 0 | 0 |
| | Crystal Nucleating Agent | SLIPACKS H | 0.3 | 0.3 | 0.3 | 0.2 | 0.2 | 0.2 |
| | | SLIPACKS O | 0 | 0 | 0 | 0.2 | 0.2 | 0.2 |
| | Nonionic Surfactant | ADEKA Pluronic 25R-2 | 0 | 0 | 0 | 0.5 | 0.5 | 0.5 |
| | | EMANON 4110 | 0 | 0 | 0 | 0.5 | 0.5 | 0.5 |
| | Hydrolysis Inhibitor | Carbodilite LA-1 | 0.2 | 0.2 | 0.2 | 0.2 | 0.2 | 0.2 |
| Stretching Conditions with Table Tenter | Set Temperature, °C. | | 55 to 60 | 55 to 60 | 55 to 60 | 55 to 60 | 55 to 60 | 55 to 60 |
| | Stretching Speed, mm/s | | 5 | 5 | 5 | 5 | 5 | 5 |
| | Stretching Ratio, % | | 1 | 5 | 7 | 1 | 5 | 7 |
| Sheet for Thermoforming | Re (obs), nm | | 10 | 87 | 100 | 10 | 87 | 109 |
| | Thickness, mm | | 0.25 | 0.25 | 0.25 | 0.25 | 0.25 | 0.25 |
| | Re (cal) | | $0.04 \times 10^{-3}$ | $0.35 \times 10^{-3}$ | $0.40 \times 10^{-3}$ | $0.04 \times 10^{-3}$ | $0.35 \times 10^{-3}$ | $0.44 \times 10^{-3}$ |
| | Relative Crystallinity, % | | 48 | 55 | 57 | 48 | 55 | 56 |
| | Heating Time, sec | Sheet Surface Temp., °C. | | | | | | |
| Evaluation, Fittability | 3.0 | 55 | B | B | B | B | B | B |
| | 3.5 | 61 | B | B | B | B | B | A |
| | 4.0 | 67 | A | A | B | B | A | A |
| | 4.5 | 73 | A | A | A | A | A | A |
| | 5.0 | 79 | A | A | A | A | A | B |
| | 5.5 | 84 | A | B | B | A | A | B |
| | 6.0 | 88 | A | B | B | A | B | B |
| | 6.5 | 93 | A | B | B | A | B | B |
| | 7.0 | 98 | B | B | B | A | B | B |
| | 7.5 | 103 | B | B | B | A | B | B |
| | 8.0 | 108 | B | B | B | B | B | B |

TABLE 4-continued

|  |  | Examples |  |  |  |  |  |
|---|---|---|---|---|---|---|---|
|  |  | 11 | 12 | 13 | 14 | 15 | 16 |
|  | 8.5 113 | B | B | B | B | B | B |
|  | 9.0 118 | B | B | B | B | B | B |
| Evaluation, Crystallinity | Relative Crystallinity, % | 100 | 100 | 100 | 100 | 100 | 100 |
| Evaluation, Transparency | Haze, % | 4.5 | 4.6 | 5.0 | 4.5 | 4.6 | 4.7 |

The amounts of the raw materials are expressed by parts by weight.

TABLE 5

|  |  |  | Examples | | |
|---|---|---|---|---|---|
|  |  |  | 17 | 18 | 19 |
| Components | Polylactic Acid Resin | NW4032D | 100 | 100 | 100 |
|  | Plasticizer | Me(EO$_3$)$_2$SA | 4 | 4 | 4 |
|  |  | TEP-2 | 4 | 4 | 4 |
|  | Crystal Nucleating Agent | SLIPACKS H | 0.3 | 0.3 | 0.3 |
|  | Hydrolysis Inhibitor | Carbodilite LA-1 | 0.5 | 0.5 | 0.5 |
| Stretching Conditions with Table Tenter | Set Temperature, °C. |  | 55 to 61 | 55 to 61 | 55 to 61 |
|  | Stretching Speed, mm/s |  | 5 | 5 | 5 |
| Sheet for Thermoforming | Stretching Ratio, % |  | 1 | 5 | 7 |
|  | Re (obs), nm |  | 10 | 67 | 81 |
|  | Thickness, mm |  | 0.25 | 0.25 | 0.25 |
|  | Re (cal) |  | $0.04 \times 10^{-3}$ | $0.27 \times 10^{-3}$ | $0.32 \times 10^{-3}$ |
|  | Relative Crystallinity, % |  | 47 | 53 | 55 |

|  | Heating Time, sec | Sheet Surface Temp., °C. |  |  |  |
|---|---|---|---|---|---|
| Evaluation, Fittability | 3.0 | 55 | A | A | A |
|  | 3.5 | 61 | A | A | A |
|  | 4.0 | 67 | A | A | A |
|  | 4.5 | 73 | A | A | B |
|  | 5.0 | 79 | A | A | B |
|  | 5.5 | 84 | A | B | B |
|  | 6.0 | 88 | A | B | B |
|  | 6.5 | 93 | A | B | B |
|  | 7.0 | 98 | A | B | B |
|  | 7.5 | 103 | A | B | B |
|  | 8.0 | 108 | A | B | B |
|  | 8.5 | 113 | B | B | B |
|  | 9.0 | 118 | B | B | B |
| Evaluation, Crystallinity | Relative Crystallinity, % |  | 100 | 100 | 100 |
| Evaluation, Transparency | Haze, % |  | 3.8 | 4.0 | 4.2 |

The amounts of the raw materials are expressed by parts by weight.

TABLE 6

|  |  |  | Examples | | | |
|---|---|---|---|---|---|---|
|  |  |  | 20 | 21 | 22 | 23 |
| Components | Polylactic Acid Resin | NW4032D | 100 | 100 | 100 | 100 |
|  | Plasticizer | Me(EO$_3$)$_2$SA | 4 | 4 | 4 | 10 |
|  | Crystal Nucleating Agent | SLIPACKS H | 0.3 | 0.3 | 0.3 | 0.3 |
|  | Nonionic Surfactant | ADEKA Pluronic 25R-2 | 1 | 1 | 1 | 0 |

TABLE 6-continued

|  |  |  | | | | |
|---|---|---|---|---|---|---|
|  | Hydrolysis Inhibitor | Carbodilite LA-1 | 0.2 | 0.2 | 0.2 | 0.2 |
| Molding Conditions for Extruded Sheet | Set Temperature of Cooling Roller, °C. |  | 20 | 20 | 30 | 30 |
|  | Sheet Surface Temp. after Contacting Cooling Roller, °C. |  | 25 | 33 | 35 | 35 |
|  | Sheet Wind-up Speed, m/minute |  | 2 | 5 | 10 | 2 |
|  | Stretching Ratio, % |  | 1 | 3 | 6 | 4 |
| Sheet for Thermo-forming | Re (obs), nm |  | 11 | 27 | 107 | 67 |
|  | Thickness, mm |  | 0.25 | 0.25 | 0.24 | 0.25 |
|  | Re (cal) |  | $0.04 \times 10^{-3}$ | $0.11 \times 10^{-3}$ | $0.45 \times 10^{-3}$ | $0.27 \times 10^{-3}$ |
|  | Relative Crystallinity, % |  | 52 | 53 | 52 | 51 |

|  | Heating Time, sec | Sheet Surface Temp., °C. | | | | |
|---|---|---|---|---|---|---|
| Evaluation, Fittability | 3.0 | 55 | B | B | B | B |
|  | 3.5 | 61 | A | A | B | B |
|  | 4.0 | 67 | A | A | A | B |
|  | 4.5 | 73 | A | A | A | A |
|  | 5.0 | 79 | A | A | A | B |
|  | 5.5 | 84 | A | A | A | B |
|  | 6.0 | 88 | A | A | B | B |
|  | 6.5 | 93 | A | B | B | B |
|  | 7.0 | 98 | B | B | B | B |
|  | 7.5 | 103 | B | B | B | B |
|  | 8.0 | 108 | B | B | B | B |
|  | 8.5 | 113 | B | B | B | B |
|  | 9.0 | 118 | B | B | B | B |
| Evaluation, Crystallinity | Relative Crystallinity, % |  | 100 | 100 | 100 | 100 |
| Evaluation, Transparency | Haze, % |  | 3.8 | 3.9 | 3.9 | 4.0 |

|  |  |  | Examples | | | Comparative Example |
|---|---|---|---|---|---|---|
|  |  |  | 24 | 25 | 26 | 4 |
| Components | Polylactic Acid Resin | NW4032D | 100 | 100 | 100 | 100 |
|  | Plasticizer | Me(EO$_3$)$_2$SA | 4 | 4 | 4 | 4 |
|  | Crystal Nucleating Agent | SLIPACKS H | 0.3 | 0.3 | 0.3 | 0.3 |
|  | Nonionic Surfactant | ADEKA Pluronic 25R-2 | 1 | 1 | 1 | 1 |
|  | Hydrolysis Inhibitor | Carbodilite LA-1 | 0.2 | 0.2 | 0.2 | 0.2 |
| Molding Conditions for Extruded Sheet | Set Temperature of Cooling Roller, °C. |  | 30 | 30 | 30 | 40 |
|  | Sheet Surface Temp. after Contacting Cooling Roller, °C. |  | 39 | 43 | 48 | 58 |
|  | Sheet Wind-up Speed, m/minute |  | 20 | 30 | 50 | 10 |
|  | Stretching Ratio, % |  | 8 | 10 | 12 | 15 |
| Sheet for Thermo-forming | Re (obs), nm |  | 156 | 202 | 227 | 237 |
|  | Thickness, mm |  | 0.24 | 0.24 | 0.24 | 0.23 |
|  | Re (cal) |  | $0.65 \times 10^{-3}$ | $0.84 \times 10^{-3}$ | $0.95 \times 10^{-3}$ | $1.03 \times 10^{-3}$ |
|  | Relative Crystallinity, % |  | 54 | 56 | 57 | 55 |

|  | Heating Time, sec | Sheet Surface Temp., °C. | | | | |
|---|---|---|---|---|---|---|
| Evaluation, Fittability | 3.0 | 55 | B | B | B | B |
|  | 3.5 | 61 | B | B | B | B |
|  | 4.0 | 67 | A | B | B | B |
|  | 4.5 | 73 | A | A | A | B |
|  | 5.0 | 79 | A | A | B | B |
|  | 5.5 | 84 | B | B | B | B |
|  | 6.0 | 88 | B | B | B | B |
|  | 6.5 | 93 | B | B | B | B |
|  | 7.0 | 98 | B | B | B | B |
|  | 7.5 | 103 | B | B | B | B |

TABLE 6-continued

|  |  |  |  |  |  |
|---|---|---|---|---|---|
|  | 8.0 | 108 | B | B | B | B |
|  | 8.5 | 113 | B | B | B | B |
|  | 9.0 | 118 | B | B | B | B |
| Evaluation, Crystallinity | Relative Crystallinity, % | 100 | 100 | 100 | 100 |
| Evaluation, Transparency | Haze, % | 4.0 | 4.1 | 4.5 | 4.2 |

The amounts of the raw materials are expressed by parts by weight.

TABLE 7

|  |  |  | Examples | | | |
|---|---|---|---|---|---|---|
|  |  |  | 27 | 28 | 29 | 30 |
| Components | Polylactic Acid Resin | NW4032D | 100 | 100 | 100 | 100 |
|  | Plasticizer | Me(EO$_3$)$_2$SA | 0 | 0 | 0 | 0 |
|  |  | TEP-2 | 2 | 2 | 1 | 1 |
|  |  | DAIFATTY-101 | 0 | 0 | 0 | 0 |
|  | Crystal Nucleating Agent | SLIPACKS H | 0.3 | 0.3 | 0.3 | 0.3 |
|  |  | SLIPACKS O | 0 | 0 | 0 | 0 |
|  | Nonionic Surfactant | ADEKA Pluronic 25R-2 | 1 | 1 | 2 | 2 |
|  |  | EMANON 4110 | 0 | 0 | 0 | 0 |
|  | Hydrolysis Inhibitor | Carbodilite LA-1 | 0.2 | 0.2 | 0.2 | 0.2 |
| Molding Conditions for Extruded Sheet | Set Temperature of Cooling Roller, ° C. | | 20 | 30 | 20 | 30 |
|  | Sheet Surface Temp. after Contacting Cooling Roller, ° C. | | 25 | 35 | 25 | 36 |
|  | Sheet Wind-up Sheet, m/minute | | 2 | 10 | 2 | 10 |
|  | Stretching Ratio, % | | 1 | 6 | 2 | 9 |
| Sheet for Thermo-forming | Re (obs), nm | | 3 | 98 | 5 | 106 |
|  | Thickness, mm | | 0.25 | 0.25 | 0.25 | 0.25 |
|  | Re (cal) | | $0.01 \times 10^{-3}$ | $0.39 \times 10^{-3}$ | $0.02 \times 10^{-3}$ | $0.42 \times 10^{-3}$ |
|  | Relative Crystallinity, % | | 50 | 52 | 48 | 49 |

|  | Heating Time, sec | Sheet Surface Temp., ° C. |  |  |  |  |
|---|---|---|---|---|---|---|
| Evaluation, Fittability | 3.0 | 55 | B | B | B | B |
|  | 3.5 | 61 | B | B | B | B |
|  | 4.0 | 67 | B | B | B | B |
|  | 4.5 | 73 | A | B | A | B |
|  | 5.0 | 79 | A | A | A | B |
|  | 5.5 | 84 | A | A | A | A |
|  | 6.0 | 88 | A | A | A | A |
|  | 6.5 | 93 | A | A | B | B |
|  | 7.0 | 98 | A | B | B | B |
|  | 7.5 | 103 | A | B | B | B |
|  | 8.0 | 108 | B | B | B | B |
|  | 8.5 | 113 | B | B | B | B |
|  | 9.0 | 118 | B | B | B | B |
| Evaluation, Crystallinity | Relative Crystallinity, % | | 100 | 100 | 100 | 100 |
| Evaluation, Transparency | Haze, % | | 4.6 | 4.8 | 4.0 | 4.9 |

|  |  |  | Examples | | | |
|---|---|---|---|---|---|---|
|  |  |  | 31 | 32 | 33 | 34 |
| Components | Polylactic Acid Resin | NW4032D | 100 | 100 | 100 | 100 |
|  | Plasticizer | Me(EO$_3$)$_2$SA | 6 | 3 | 4 | 4 |
|  |  | TEP-2 | 0 | 0 | 0 | 4 |
|  |  | DAIFATTY-101 | 0 | 3 | 0 | 0 |

TABLE 7-continued

| | | | | | | |
|---|---|---|---|---|---|---|
| | Crystal Nucleating Agent | SLIPACKS H | 0.3 | 0.3 | 0.2 | 0.3 |
| | | SLIPACKS O | 0 | 0 | 0.2 | 0 |
| | Nonionic Surfactant | ADEKA Pluronic 25R-2 | 0 | 0 | 0.5 | 0 |
| | | EMANON 4110 | 1 | 0 | 0.5 | 0 |
| | Hydrolysis Inhibitor | Carbodilite LA-1 | 0.5 | 0.2 | 0.2 | 0.5 |
| Molding Conditions for Extruded Sheet | Set Temperature of Cooling Roller, °C. | | 30 | 30 | 30 | 30 |
| | Sheet Surface Temp. after Contacting Cooling Roller, °C. | | 35 | 36 | 37 | 36 |
| | Sheet Wind-up Speed, m/minute | | 10 | 10 | 10 | 10 |
| | Stretching Ratio, % | | 8 | 7 | 7 | 8 |
| Sheet for Thermo-forming | Re (obs), nm | | 102 | 110 | 114 | 87 |
| | Thickness, mm | | 0.25 | 0.25 | 0.25 | 0.24 |
| | Re (cal) | | $0.41 \times 10^{-3}$ | $0.44 \times 10^{-3}$ | $0.46 \times 10^{-3}$ | $0.36 \times 10^{-3}$ |
| | Relative Crystallinity, % | | 53 | 56 | 54 | 56 |

| | Heating Time, sec | Sheet Surface Temp., °C. | | | | |
|---|---|---|---|---|---|---|
| Evaluation, Fittability | 3.0 | 55 | B | B | B | A |
| | 3.5 | 61 | B | B | A | A |
| | 4.0 | 67 | A | B | A | A |
| | 4.5 | 73 | A | A | B | B |
| | 5.0 | 79 | B | B | B | B |
| | 5.5 | 84 | B | B | B | B |
| | 6.0 | 88 | B | B | B | B |
| | 6.5 | 93 | B | B | B | B |
| | 7.0 | 98 | B | B | B | B |
| | 7.5 | 103 | B | B | B | B |
| | 8.0 | 108 | B | B | B | B |
| | 8.5 | 113 | B | B | B | B |
| | 9.0 | 118 | B | B | B | B |
| Evaluation, Crystallinity | Relative Crystallinity, % | | 100 | 100 | 100 | 100 |
| Evaluation, Transparency | Haze, % | | 5.6 | 5.2 | 4.9 | 4.8 |

The amounts of the raw materials are expressed by parts by weight.

From the results of Tables 1 to 7, the sheet for thermoforming of the present invention had a wide molding temperature region, and the thermoformed article obtained showed a high crystallinity and excellent transparency.

INDUSTRIAL APPLICABILITY

The sheet for thermoforming of the present invention has a wide moldable temperature region, so that the sheet can be suitably used in various applications such as food containers, packaging materials for daily sundries and household electric appliances, and industrial trays of industrial parts.

The invention claimed is:
1. A method for producing a sheet for thermoforming, comprising the following steps (I) to (III):
step (I): extruding a polylactic acid resin composition from an extruder at a temperature of from 170° to 240° C. to prepare a sheet molded article,
wherein the polylactic acid resin composition further comprises a nonionic surfactant, and wherein the nonionic surfactant contains a compound represented by the formula (3):

$$R^6\text{—}O(A_2O)_p\text{—}R^7 \qquad (3)$$

wherein $R^6$ is an alkyl group having from 8 to 22 carbon atoms, an acyl group having from 8 to 22 carbon atoms in total, or a hydrogen atom; $R^7$ is a hydrogen atom, an alkyl group having from 1 to 4 carbon atoms, or an acyl group having from 2 to 4 carbon atoms in total; $A^2$ is an alkylene group having 2 or 3 carbon atoms; p is the number of average moles of an oxyalkylene group added, wherein p is the number satisfying 0<p 300, and wherein p number of oxyalkylene groups represented by $(A^2O)$ may be identical or different, and the repeating units, when different, may be either in a block form or a random form;
step (II): providing the sheet molded article obtained in the step (I) into contact with a cooling roller at a temperature of lower than 40° C., to cool the sheet molded article to a sheet surface temperature of from 0° to 50° C.; and
step (III): winding up the sheet molded article from the cooling roller in the step (II) under the condition that a stretching ratio is 5% or less,
wherein the sheet for thermoforming has a thickness of from 0.1 to 1.5 mm, made of the polylactic acid resin composition comprising a polylactic acid-based resin, and a plasticizer in an amount of from 1 to 20 parts by weight and a crystal nucleating agent in an amount of from 0.01 to 1 part by weight, based on 100 parts by weight of the polylactic acid-based resin,
wherein the sheet for thermoforming obtained has Re (cal) calculated by the following formula (A):

$$Re(cal)=Re(obs)/d \times 10^{-6} \qquad (A)$$

wherein Re (obs) is a phase difference (nm) measured at a wavelength selected from wavelengths of from 380 to 780 nm, and d is a thickness (mm) of the sheet, and is controlled within a range to provide a Re (cal) value of $0.03 \times 10^{-3} \leq$ Re (cal) $0.3 \times 10^{-3}$.

2. The method according to claim 1, wherein the content of the nonionic surfactant is 0.5 parts by weight or more and 2.5 parts by weight or less.

3. The method according to claim 1, wherein the wind-up speed is from 1 to 20 m/minute.

4. The method according to claim 1, wherein the thickness is from 0.2 mm or more and 0.7 mm or less.

\* \* \* \* \*